United States Patent [19]

Kilby et al.

[11] 3,819,921

[45] June 25, 1974

[54] MINIATURE ELECTRONIC CALCULATOR

[75] Inventors: Jack S. Kilby; Jerry D. Merryman; James H. Van Tassel, all of Dallas, Tex.

[73] Assignee: Texas Instruments Incorporated, Dallas, Tex.

[22] Filed: Dec. 21, 1972

[21] Appl. No.: 317,493

Related U.S. Application Data

[63] Continuation of Ser. No. 143,192, May 13, 1971, abandoned, which is a continuation of Ser. No. 671,777, Sept. 29, 1967, abandoned.

[52] U.S. Cl. .................................. 235/156, 235/159

[51] Int. Cl. .............................................. G06f 7/38

[58] Field of Search .................... 235/156, 159, 145; 340/365, 347 DD; 219/201

[56] References Cited

UNITED STATES PATENTS

| | | | |
|---|---|---|---|
| 2,932,816 | 4/1960 | Stiefel et al. | 340/347 DD |
| 3,140,031 | 7/1964 | Fitch | 226/109 |
| 3,315,069 | 4/1967 | Bohm | 235/156 X |
| 3,331,954 | 7/1967 | Kinzie et al. | 235/156 |
| 3,354,817 | 11/1967 | Sakurai et al. | 101/93 |
| 3,405,392 | 10/1968 | Milne et al. | 235/156 X |
| 3,430,226 | 2/1969 | Chow | 340/347 |
| 3,509,329 | 4/1970 | Wang et al. | 235/156 |
| 3,548,179 | 12/1970 | Kimura et al. | 235/156 |
| 3,553,445 | 1/1971 | Hernandez | 235/156 |

OTHER PUBLICATIONS

National Technical Report, Vol. 12, No. 2, 1966, pp. 129–137, (Published by Matsushita Electric Industrial Co., Ltd., Japan).

*Primary Examiner*—Charles E. Atkinson
*Assistant Examiner*—James F. Gottman
*Attorney, Agent, or Firm*—Harold Levine; Edward Connors, Jr.; John G. Graham

[57] ABSTRACT

Binary-coded decimal electronic calculator capable of adding, subtracting, multiplying and dividing with some degree of automatic decimal point placement to provide a visual display of answers of up to 12 decimal digits. The decimal digits are serially displayed at a speed compatible with the calculator operations. The parts of the calculator are so adapted electrically and mechanically in relation to each other to result in a minature portable battery operated calculator of extremely small dimensions for example the outside case dimensions of 4¼ inches by 6⅛ inches by 1¾ inches and very low weight of about 45 ounces, having a calculating capability only before obtainable in calculators of much larger size and weight while retaining mechanical and operational simplicity. Some significant aspects of the calculator are the primary electronics embodied in an integrated semiconductor circuit array located in substantially one plane for performing the arithmetic calculations and generating the control signals, a keyboard input arrangement located in substantially one plane parallel to the integrated semiconductor circuit array for producing unique electrical signals corresponding to number and command entries and a visual display using a semiconductor array, as for a thermal printer for printout.

59 Claims, 36 Drawing Figures

INVENTORS
JACK S. KILBY, ET AL
BY MELVIN SHARP
ATTORNEY

PATENTED JUN 25 1974

3,819,921

SHEET 08 OF 21

PATENTED JUN 25 1974

3,819,921

SHEET 09 OF 21

MINIATURE ELECTRONIC CALCULATOR

This application is a conitnuation of copending application Ser. No. 143,192, filed May 13, 1971 (now abandoned), which was a continuation of then-copending application Ser. No. 671,777, filed Sept. 29, 1967 (now abandoned).

The present invention relates to electronic calculators and more particularly to miniature portable electronic calculators capable of adding, subtracting, multiplying and dividing.

An object of the present invention is to provide an electronic calculator of a size substantially smaller than heretofore obtainable.

Another object of the present invention is to provide a miniature portable electronic calculator having a high degree of calculating capability and mechanical and operational simplicity.

A feature of the invention is a miniature electronic calculator having its primary electronics embodied in an integrated semiconductor circuit array located in substantially one plane for performing the arithmetic calculations and generating the control signals.

Another feature of the invention is a miniature electronic calculator having a keyboard encoder located in substantially one plane for encoding a mechanical entry into a unique signal and an integrated semiconductor circuit array located substantially in one plane parallel to the keyboard encoder for performing the arithmetic calculations and generating the control signals.

Still another feature of the invention is a miniature electronic calculator having an integrated semiconductor circuit array located in substantially one plane for performing the arithmetic calculations and generating the control signals for a thermal printer comprising an integrated semiconductor heater element array.

Other objects, features and advantages of the invention may be best understood by reference to the following detailed description taken in conjunction with the accompanying drawings in which like reference numerals indicate like parts and in which.

Figure 1:
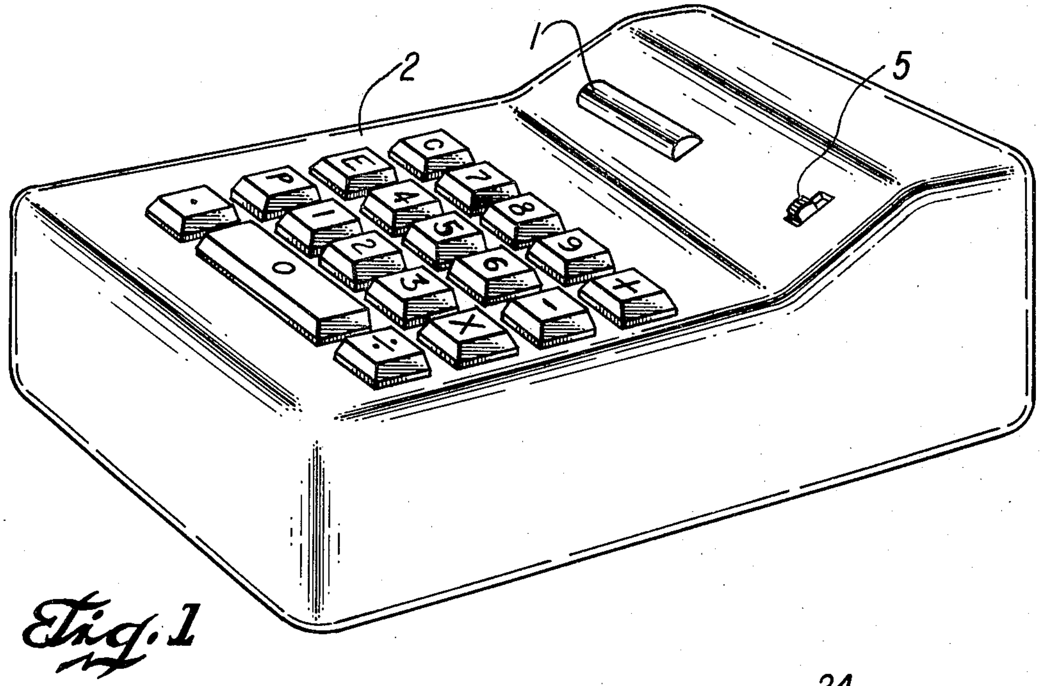
FIG. 1 illustrates the exterior casing of the calculator, according to an embodiment of the present invention.

Referring to FIG. 1, there is illustrated the exterior casing 2 of the miniature portable calculator according to an embodiment of the present invention in which the numeric and command entries are made to the calculator by depressing the numeric keys 0–9, the add key +, the subtract key −, the multiply key ×, the divide key ÷, the clear kcy C, the error key E, the print key P, and the decimal point key . . The calculator is turned on and off by the switch 5 and the printout is viewed through the magnifying lens window 1.

Figure 2:
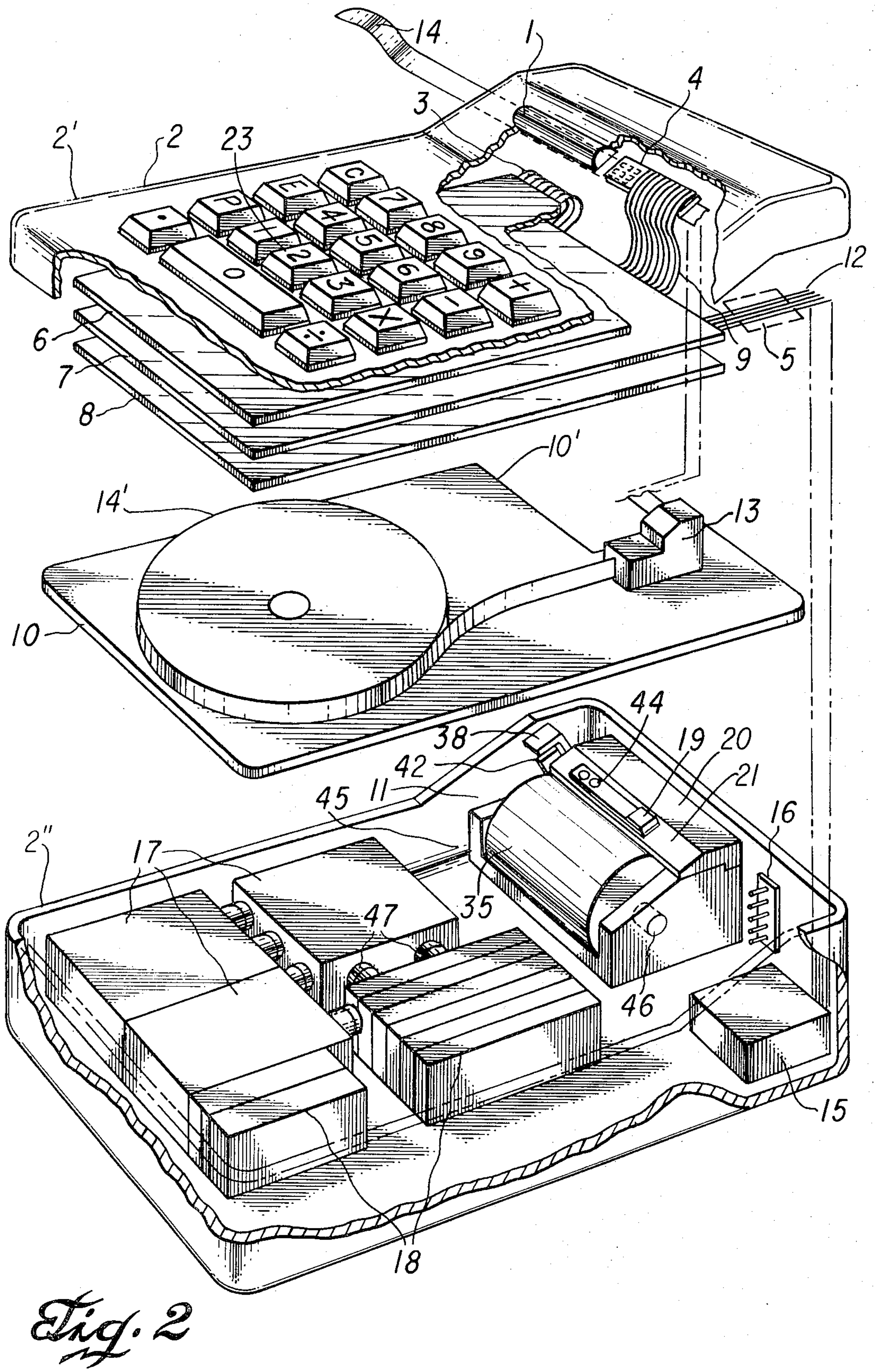
FIG. 2 illustrates the mechanical relationship of the parts of the calculator of FIG. 1.

Referring to FIG. 2, the 18 entry keys 0–9, +, −, ×, C, E, P, ÷, and . are mounted in the casing 2 above the keyboard encoder 6 in a manner such that the depression of a key causes the key to communicate with conductive strips on the keyboard encoder 6, thereby electrically encoding the key depression so that it can be transmitted to the primary electronics 7 mounted below the encoder 6. The encoder key depression is transmitted from encoder 6 to the primary electronics 7 by the electrical connections 3. The printout tape 14 is arranged in a reel 14′ resting on the shelf 10. The printout tape 14 advances from the reel 14′ in a vertical position through the guide block 13, which translates the vertical position to a horizontal position so that the tape 14 can advance past the underside of the thermal printer 4 and past the magnifying lens window 1 for readout of the printed information. Electrical connections 9 provide the electrical communication between the primary electronics 7 and the thermal printer 4. The case 2 is composed of two parts 2' and 2'', which may be connected together by hinges and a latch so that part 2' is movable in an upward direction with respect to part 2'' in order to allow access to the interior of the casing 2. The power supply batteries 17 and 18, the module 15 containing the auxilary electronics and the tape advance system 11 are fixed on the floor of the casing 2''. A battery charger plug 16 is also provided in the wall of the bottom casing 2''. The shelf 10 fits within the bottom casing 2'' and rests on the batteries 17 and 18 and module 15 for support. The cutout 10' is provided in the shelf 10 in order to expose the tape advance system 11. The tape 14 advances out of the guide block 13 over the resilient pressure pad 19, through the opening 42 and emerges at the exterior of casing 2 through an opening in the side of the casing 2. The physical relationship of the parts is better illustrated with reference to FIG. 3 in which the tape 14 advances out of the guide block 13 over the pressure pad 19 through an opening 42, the thermal printer 4 being positioned above the pressure pad in a manner that the printing takes place at the underside of the printer 4 above the pressure pad 19. Whereas, the information is printed on the top surface of the paper 14 and is viewed from the window 1 to the left of the printer 4. An insulating plexi glass protective cover plate 8 is mounted above the shaft 10 to separate the shelf 10 from the primary electronics 7. Electrical connections are provided between the power supply batteries 17 and 18 and the auxiliary electronics contained in module 15 on the floor of the bottom casing 2'' which are in turn electrically connected to the primary electronics 7 through wires 12 and on/off switch 5.

According to the present invention, the mechanical and electrical parts and their relationship are so adapted with regard to each other so as to provide a very small compact portable calculator of mechanical and operational simplicity and having a high degree of calculating capability which was only before obtainable in calculators of much larger size. For example, according to the described embodiment of the invention, the outside dimensions of the exterior casing 2 are 4¼ inches by 6⅛ inches by 1¾ inches and the calculator weights 45 ounces thereby providing a miniature portable electronic calculator of pocket-size dimensions.

The individual parts of the calculator will now be described so that their relationships may be better understood.

Keys (23) and Keyboard Encoder (6)

The 18 keys provide the means for entering the digits 0–9 and the various commands into the calculator. The depression of a key communicates with the keyboard encoder in the manner to provide a unique electrical signal indicative of the information inscribed on the selected key. In this example, the calculator uses the excess 3 binary decimal code and the encoder directly encodes a key depression into this code. That is, the binary representation of each of the 10 numeric entries is 3 larger than it would be in the conventional binary code. The following Table I illustrates the excess 3 binary decimal code by showing the decimal number entry of a key depression in relation to its binary representation in the excess 3 binary decimal code.

TABLE I

| Decimal Number | Binary Representation |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

Figure 5:
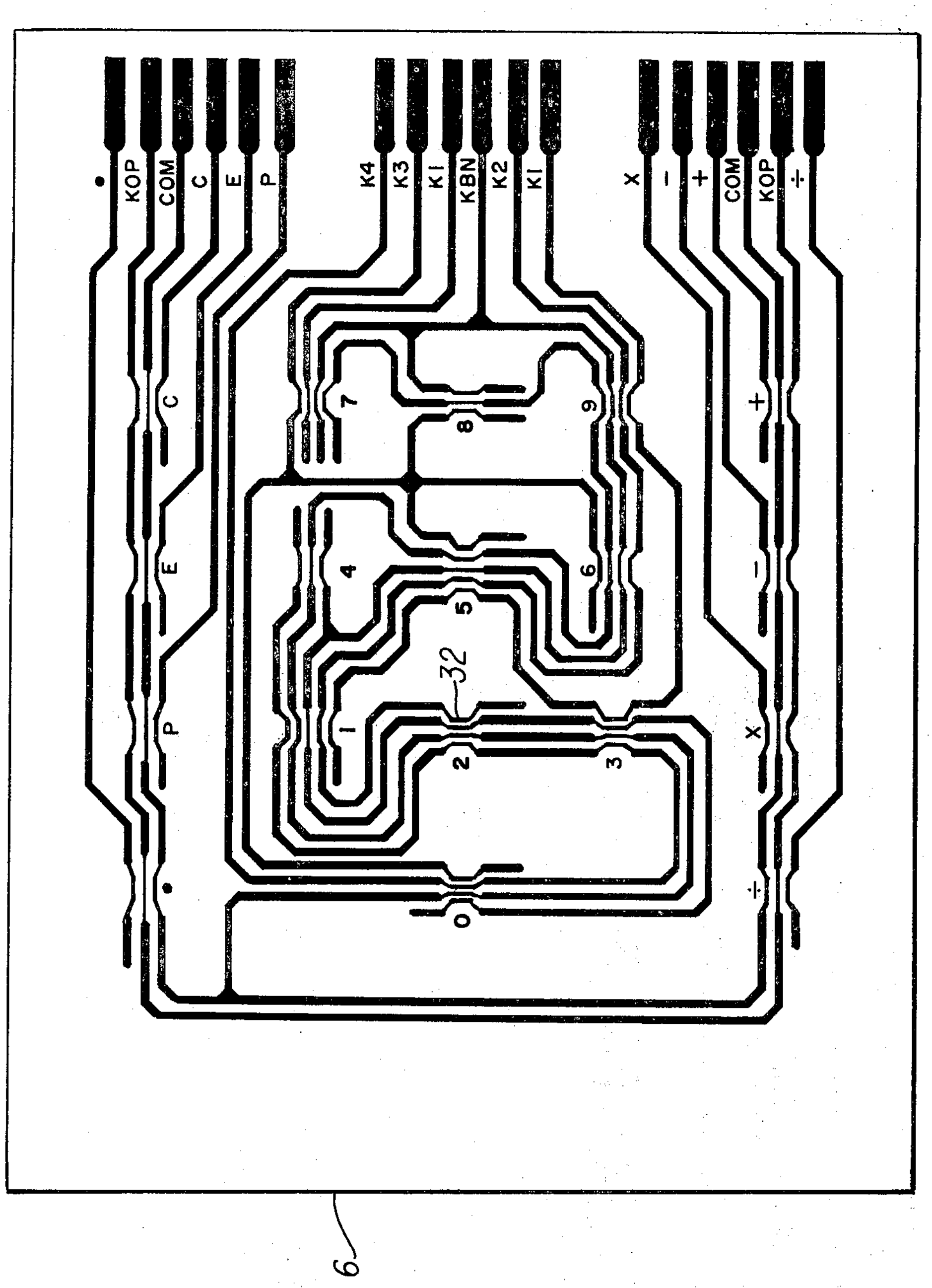
FIG. 5 illustrates the keyboard encoder 6 of the calculator of FIG. 2.

Thus, each numeric key depression results in 4 binary bits as shown above one each at the K 4, K 3, K 2, K 1 output terminals of the keyboard encoder 6 illustrates in FIG. 5. A zero in the code is represented by a short circuit to ground. A 1 is represented by the unshorted state of the terminal. The 4 binary bits representing a decimal number are arranged in the order K4, K3, K2, and K1.

Figures 3, 4:
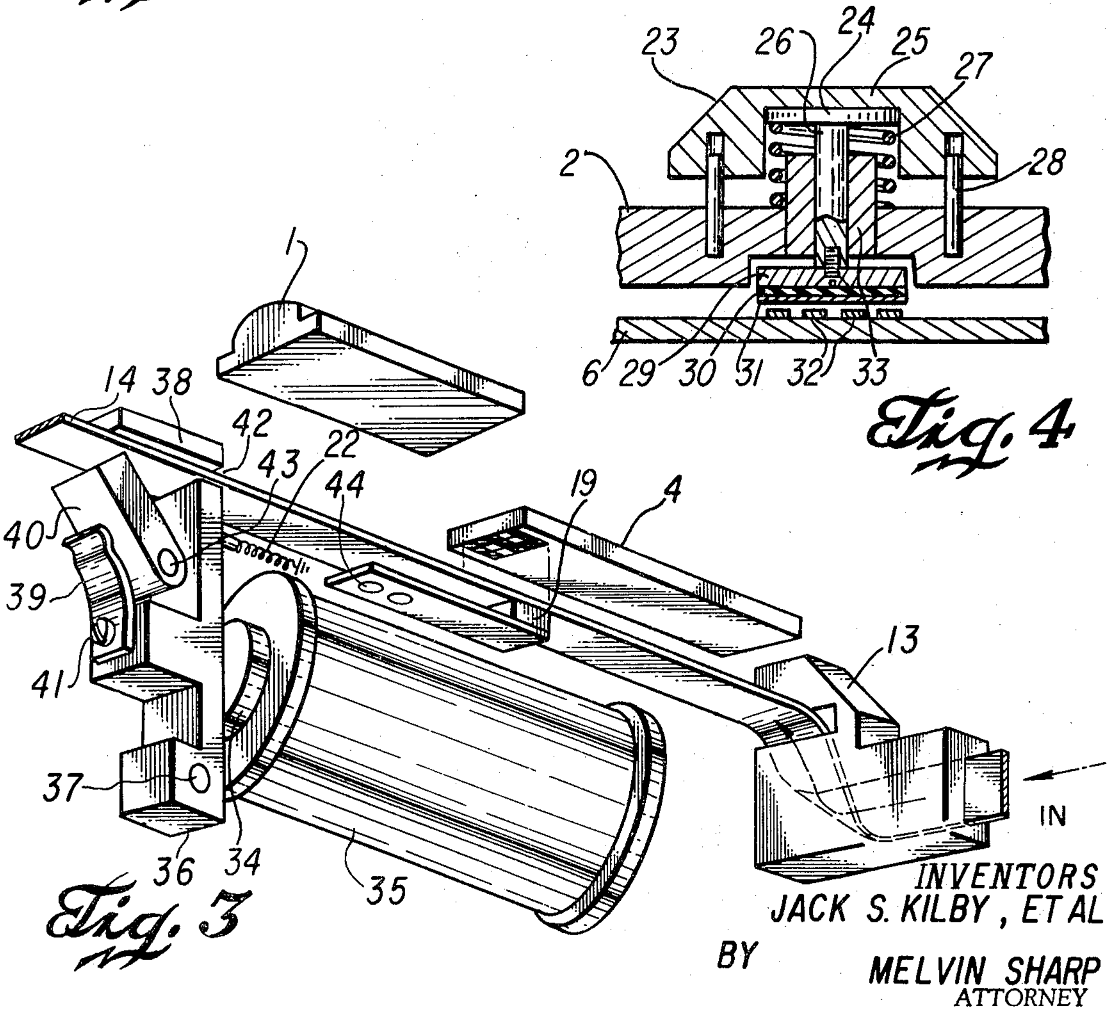
FIG. 3 illustrates the tape advance system 11 and thermal printer 4 for printout in the calculator of FIG. 2.
FIG. 4 illustrates the key 23 and keyboard encoder 6 of the calculator of FIG. 2.

Referring to FIG. 4, a key 23 is mounted in the casing 2 which is fixed with respect to the keyboard encoder 6. Located on the encoder 6 are conductive strips 32 so that when the key 23 is depressed, the conductive layer 31 electrically short circuits the conductive strips 32. Referring to FIG. 5 and in the case that the key 23 depressed is a numeric 2 entry, the four conductive strips 32 associated with the number 2 are short circuited resulting in the terminals KBN, K4, K2, and COM being short circuited to provide the desired encoded entry into the calculator.

The COM conductive strip is the ground connection. Consequently, the K4 terminal is shorted to ground and represents zero in the binary code, the K3 terminal is not shorted to ground and represents 1 in the binary code, terminal K2 is shorted to ground and represents zero in the binary code and terminal K1 is not shorted to ground and represents 1 in the binary code.

The KBN, K4, K2, and COM commands will then be transmitted to the primary electronics 7. In like manner, the other key entries will be encoded by the encoder 6 and transmitted to the primary electronics 7.

The casing 2 is provided with holes respectively accommodating the keys. Referring to FIG. 4, the hole in the casing 2 comprises two sections, the top section having a smaller diameter than the bottom section. The bearing 33 is secured within the smaller diameter section of the hole in casing 2 and extends above the casing 2. The key shaft 26 is movably positioned within a central opening in the bearing 33. Affixed to the key shaft 26 is the key shaft head 24 which provides a convenient surface on which is affixed the key cap 25. A helix spring 27 is positioned between the key shaft head 24 and the casing 2 to provide upward biasing on the cap 24 so that when the pressure is released, the key returns to its normal position leaving the conductors 32 unshorted. Affixed to shaft base 29 is a resilient pad 30 having a thin gold plated copper strip 31. Guide pins 28 are fixed in anchor holes in the casing 2 and slidably mounted in openings in the cap 25. The guide pins 28 prevent rotational movement of the key shaft 26.

FIG. 5 illustrates the keyboard encoder 6 which comprises an insulating substrate on which is located the illustrated pattern of conductive strips. The symbols 0–9, C, E, P, ÷, . , ×, −, and + correspond to the like symbols on the caps of the keys shown in FIG. 2 in the manner that the numeric 2 entry of key 23, for example, shorts out the group of conductive strips 32 associated with the 2 in FIG. 5.

The keyboard encoder 6 accomplishes in substantially one plane the generation of unique electrical signals at its output terminals corresponding to the selected information inscribed on the caps of the keys.

The following Table II illustrates the relationship between a key depression and the shorted output terminals of the keyboard encoder 6 of FIG. 5.

TABLE II

| Key Depressed | Terminals Shorted |
|---|---|
| 0 | KBN, K4, K3, COM |
| 1 | KBN, K4, K2, K1, COM |
| 2 | KBN, K4, K2, COM |
| 3 | KBN, K4, K1, COM |
| 4 | KBN, K4, COM |
| 5 | KBN, K3, K2, K1, COM |
| 6 | KBN, K3, K2, COM |
| 7 | KBN, K3, K1, COM |
| 8 | KBN, K3, COM |
| 9 | KBN, K2, K1, COM |
| . | KOP, ., COM |
| P | KOP, P, COM |
| E | KOP, E, COM |
| C | KOP, C, COM |
| ÷ | KOP, ÷, COM |
| × | KOP, ×, COM |
| − | KOP, −, COM |
| + | KOP, +, COM |

A detailed description of the keys and keyboard encoder is found in copending U.S. patent application Ser. No. 671,805, filed Sept. 29, 1967, abandoned and refiled Nov. 12, 1970 as continuation application Ser. No. 089,016, now U.S. Pat. No. 3,696,411, entitled Keyboard Encoder filed by Jack S. Kilby and James H. VanTassel and assigned to the assignee of the present application. Said copending application by Jack K. Kilby and James H. VanTassel is incorporated herein by reference.

Thermal Printer 4

Figures 6, 7:
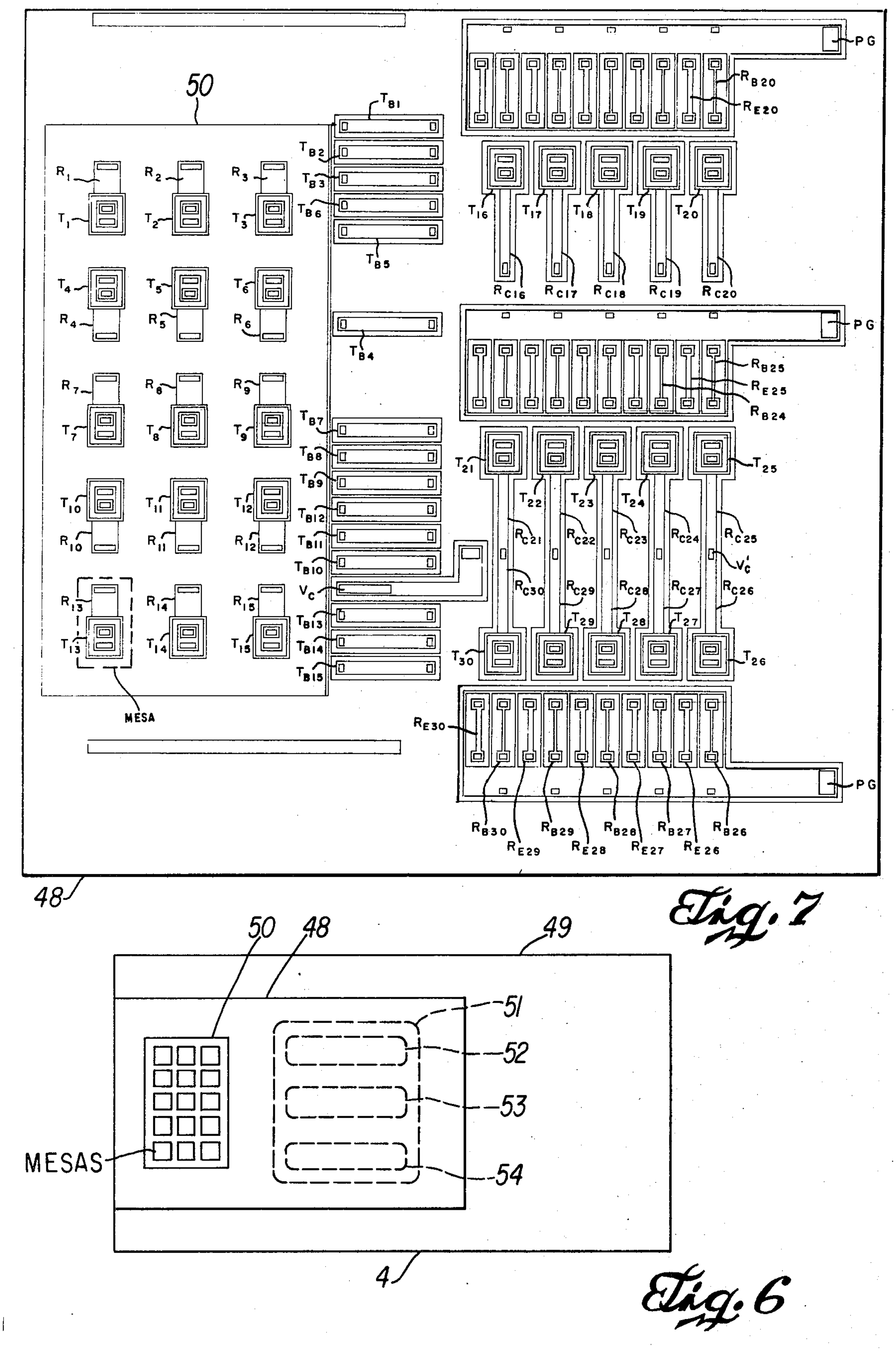
FIG. 6 illustrates the thermal printer 4 of the calculator of FIG. 2.
FIG. 7 illustrates the heater element array and drive matrix therefor of the thermal printer of FIG. 6.

The thermal printer 4 comprises a 3 × 5 array of integrated semiconductor heater elements located in thermal communication with the tape 14 which is thermally sensitive material that changes color upon the application of heat thereto. The thermally sensitive tape 14 may be the commercially available paper marketed under the trade name "Thermofax" by Minnesota Mining and Manufacturing Company. FIG. 6 illustrates a 3 × 5 array of means located within the window 50 in a semiconductor wafer 48. Each heater element of the 3 × 5 array comprises a monocrystalline semiconductor body in a mesa shape and contains a heater element formed therein at the side of the mesa adjacent the larger insulating support 49 so that when the heater element is energized a "hot spot" is formed at the surface of mesa to provide a localized dot on the thermally sensitive material 14. A group of selectively energized heater elements forms a group of dots on the thermally sensitive material 14 thereby defining a numeric character 0–9 or symbols C, E, P, ., ÷, ×, −, + which is printed on the thermally sensitive material 14. The mesas comprising the heater element array are air-isolated from each other and joined by a metallic connecting pattern located between the mesas and the insulating support 49 which pattern interconnects the heater elements in the mesas in the desired circuit configuration. A drive matrix for selectively energizing the heater elements and supplying the desired power to them is located in the semiconductor wafer 48 in the area generally designated 51. The circuit elements forming the drive matrix are integral within the semiconductor wafer 48, PN junction isolated from one another and interconnected in the desired configuration by a metallic connecting pattern between the semiconductor wafter 48 and the insulating support 49. The heating element array and the drive matrix are also interconnected in the desired circuit configuration by the metallic connecting pattern between the semiconductor wafer 48 and the insulating support 49. The surface of the printer 4 illustrated in FIG. 6 corresponds to the bottom surface of the printer 4 illustrated in FIG. 3. That is, the surface of the printer 4 illustrated in FIG. 6 is adjacent the surface of the thermally sensitive material 14 and the thermally sensitive material 14 is in direct contact with the surface of the semiconductor wafer 48 illustrated in FIG. 6.

Referring to FIG. 6, 52, 53 and 54 are openings in the insulating support 49 so that external connections can be made to the heater element array and drive matrix from the surface of the insulating support 49 which is remote from the semiconductor wafer 48. These openings 52–54 are aligned with bonding pads on the metallic connecting pattern between the semiconductor wafer 48 and the insulating support 49. A conductive pattern is applied onto the surface of the insulating support 49 which is remote from the semiconductor wafer 48. Electrical connections are made to this conductive pattern and to the primary electronics 7 by way of the electrical connections 9 illustrated in FIG. 2.

FIG. 7 illustrates the semiconductor wafer 48 in an intermediate stage of its manufacture in order to show the layout of circuit elements formed in the semiconductor wafer 48 by utilizing the planar process which circuit elements comprise the heater element array and the drive matrix therefor.

Referring to FIG. 7, a 3 × 5 array of transistor-resistor pairs is formed on the surface of the P-type semiconductor wafer 48 in the area designated 50 which corresponds to the area of the window 50 in FIG. 6. The heater element array comprises the diffused transistor-resistors pairs, i.e. triple diffused NPN transistors T1 through T15 and their respective N-type diffused resistors R 1 through R 15. Each resistor R1 through R 15 has one of its ends integral with the collector of its respective transistor in the manner that the resistor is ohmically connected to the collector of its corresponding transistor internally of the semiconductor material. The drive matrix for the heater element array comprises 15 triple diffused NPN transistors T 16 through T 30 and their respective diffused N-type collector resistors $R_{C16}$ through $R_{C30}$ having one of their ends integral with the collectors and ohmically connected therewith internally of the semiconductor material. The drive matrix also includes 15 diffused P-type base resistors and 15 diffused P-type emitter resistors associated with the 15 transistors T 16 through T 30. Each P-type base and emitter resistor is surrounded by an N type isolating region whereby the insulating PN junctions isolate it from the other circuit elements and from one another. Diffused N-type conductive tunnels $T_{B1}$ through $T_{B15}$ are provided in the surface of the semiconductor wafer 48 to allow interconnection between the base electrodes of the transistors T 1 through T 15 and the emitter electrodes of the transistors T 16 through T 30.

Figure 8:
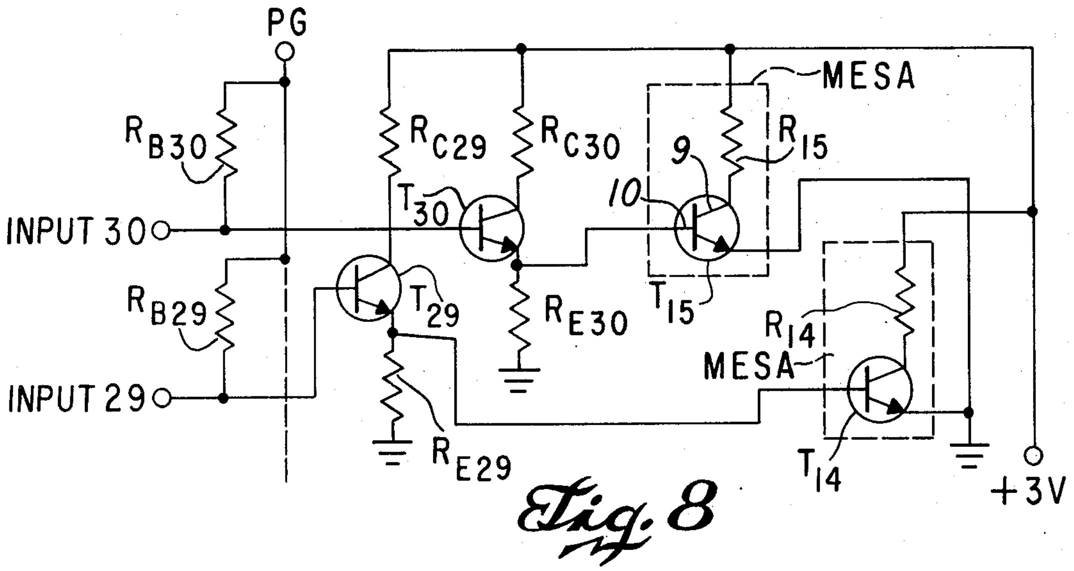
FIG. 8 illustrates the electrical schematic of the heater element array and drive matrix therefor of the thermal printer of FIG. 6.

Diffused N-type conductive tunnel $V_C$ is provided in the surface of the semiconductor wafer 48 in order to interconnect the free end of the resistors R 1 through R 15 and the common terminal $V_C$, of the resistors $R_{C21}$ through $R_{C30}$. Three diffused N-type conductive tunnels PG are provided in the surface of the semiconductor wafer 48 to respectively interconnect one end of the base resistors $R_{B16}$ through $R_{B20}$, $R_{B21}$, $R_{B25}$ and $R_{B26}$ through $R_{B30}$. One end of the three tunnels PG will be interconnected by a metallic strip to provide a common terminal PG. A metallic connecting pattern is placed on an insulating layer on the surface of the semiconductor wafer 48 of FIG. 7 in order to connect the circuit elements in the desired circuit arrangement which is illustrated in FIG. 8. The printer 4 comprises 15 mesas and associated drive circuitry and two of the mesas and their associated drive circuitry are illustrated in FIG. 8 for simplicity. The printer 4 therefore comprises 15 inputs for selectively energizing the 3 × 5 heater element array, a ground input, a collector voltage biasing input $V_C$ (+ 3 volts) and the PG input. The PG input is the print command and allows the heater element array to be selectively energized.

Referring to FIG. 8, two of the 15 inputs are shown as input 29 and input 30 which are respectively connected to the base electrodes of the drive transistors T 29 and T 30. The PG input is connected to each of the base electrodes of the drive transistors T 30, T 29 respectively by way of the base resistors $R_{B30}$, $R_{B29}$ in a manner that, when positive pulses concurrently appear at terminals PG and one of the input terminals for example input 30 the selected drive transistor in this case T 30 is energized and triggers the transistor T 15 in the selected mesa. Accordingly when positive pulses concurrently appear at a terminal PG and terminal input 30, the transistor T 30 is triggered on thereby raising the voltage at its emitter to cause the transistor T 15 to trigger on and draw current through the resistor R 15 thereby causing the hot spot. The concurrent appearance of a positive pulse at terminal PG and at a group of input terminals causes a selected group of mesas to be heated and print out the desired character or symbol.

A detailed description of the thermal printer is found in copending U.S. patent application Ser. No. 671,821, now U.S. Pat. No 3,501,615 entitled "Integrated Heater Element Array and Drive Matrix by Merryman et al., filed Sept. 29, 1967 and assigned to the assignee of the present application (U.S. Pat. Nos. 3,571,917 and 3,601,669 also issued from Ser. No. 671,821 by divisional applications filed May 7, 1969). Said U.S. Pat. No. 3,501,615 by Merryman et al is incorporated herein by reference.

Tape Advance System 11

The tape advance system 11 advances the tape 14 to a new position a predetermined time after a number or symbol is printed on the tape 14 in response to an electrical command signal. Referring to FIG. 2, the tape advance system 11 comprises support frame 45 secured to the bottom casing 2'', magnetic coil 35 secured in the support frame 45, the pole piece 46 secured within a central opening in the coil 35 and having one end secured to the magnetic coil 35 so that the pole piece 46 firmly secures the magnetic coil 35 in the support frame 45, and upper frame member 20 on which is secured the plate 44, having the resilient pressure pad 19. The tape 14 passes over and in contact with the resilient pressure pad 19 and then through the opening 42. Tha tape advance system 11 is illustrated in FIG. 3 without the support frame 45 for simplicity.

Referring to FIG. 3, the pole piece 46 illustrated in FIG. 2 has its end secured to the end section 34, which has a larger diameter than the central opening in the coil 35. The clapper 36 comprised of ferro-magnetic material is pivoted at the point 37 which is fixed to the support frame 45 so that when the magnetic coil 35 is actuated in response to an electrical signal, a magnetic field is created which attracts the clapper 36 and pulls it toward and against the end section 34. Clutch 40 is pivotally mounted on the clapper 36 at point 43. Clutch spring 39 is secured to the clapper 36 at point 41 and contacts the clutch 40 to bias it toward clapper 36. The parts 36, 40, and 39 of FIG. 3 are illustrated in their normal position. That is, the magnetic coil 35 is unactuated. When an electrical signal is applied to coil 35 in order to actuate it, a magnetic field is created attracting clapper 36 toward end section 34. The abrupt movement of clapper 36 causes clutch 40 to be thrust away from clapper 36 and out of contact with the tape 14 as the clapper 36 pivots. When the clapper 36 stops against end section 34, the momentum of the clutch and the force exerted by the clutch spring 39 force the edge of clutch 40 into contact with tape 14. The tape 14 is thus gripped between the clutch 40 and the clutch plate 38. The magnetic field created by the coil 35 is sufficient to move the clapper 36 toward the end section 34 against the biasing of drive spring 22. When the electrical signal applied to the coil 35 is removed and the magnetic field collapses, the drive spring 22 pushes the clapper 36 away from the end section 34 and the tape 14 gripped between the clutch 40 and the clutch plate 38 is advanced in the direction of the arrow by an amount proportional to the clapper stroke, that is, the extent to which the clapper 36 moves away from the end section 34. The speed with which the magnetic field collapses when the electrical signal applied to coil 35 is removed causes the clapper 36 to abruptly thrust forward in the direction of the arrow under the pressure of spring 22. Consequently, the tape 14 is quickly advanced forward in a stepwise fashion in response to electrical signals applied to the coil 35.

Figures 19, 20:
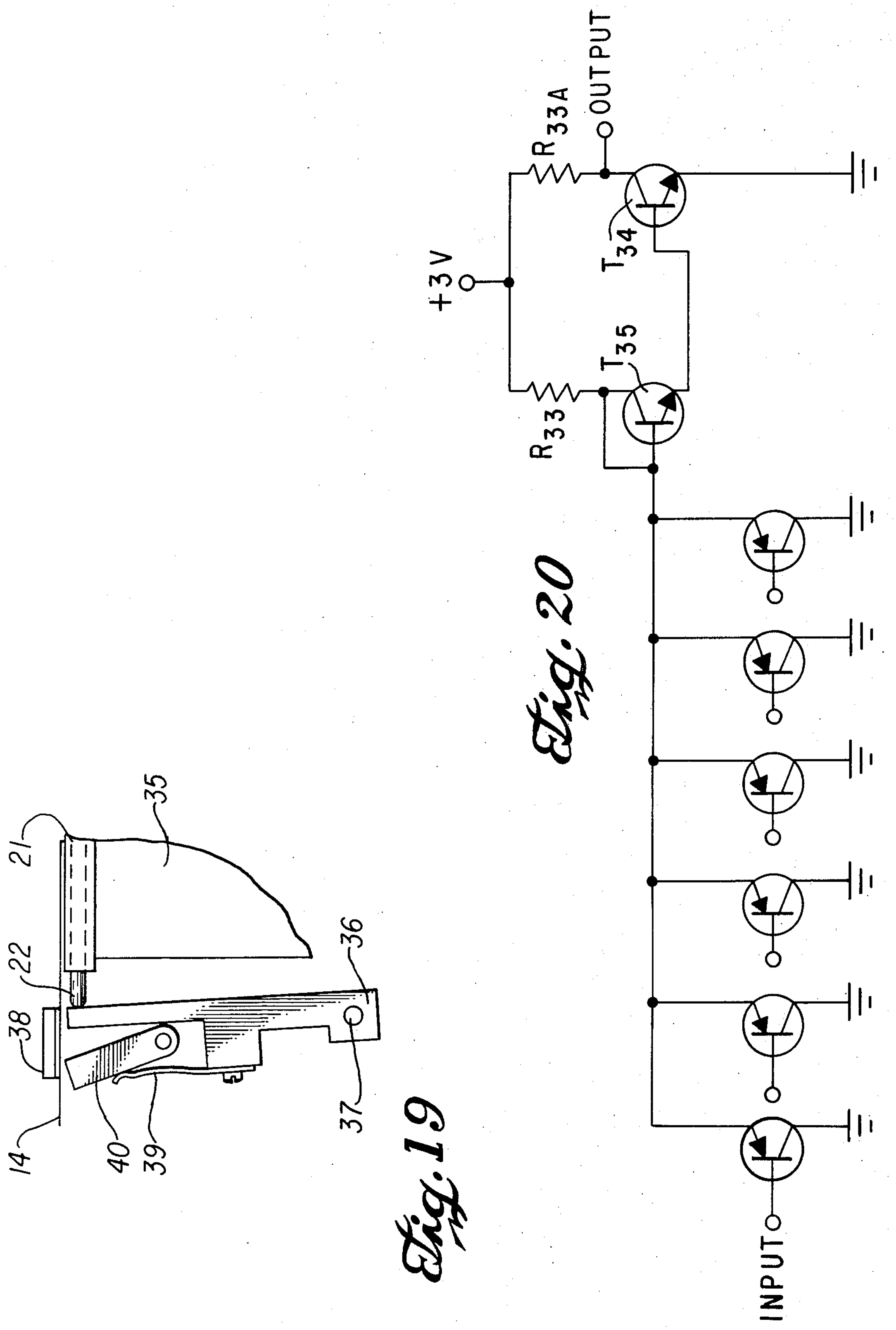
FIG. 19 illustrates a partial view of the tape advance system 11 of FIG. 2.
FIG. 20 illustrates a typical circuit comprising a gate in FIGS. 15–18.

FIG. 19 illustrates the drive spring 22 mounted within a lengthwise hole 21 in the upper frame member 20. Whereas, the spring 22 contacts the clapper 36 during the normal position of the tape advance system and is depressed inwardly of the past 20 when the coil 35 is activated and the clapper attracted. A screw can be provided in a larger hole in the clapper 36 extending into the upper frame 20 so that the clapper stroke moving away from the end section 34 will be limited or stopped at a predetermined stroke distance. The coil 35 will comprise two terminals for the electrical input signal, one being grounded.

The guide block 13, thermal printer 4, lens window 1, plate 44, opening 42, and tape 14 are illustrated in FIG. 3 in their relative physical positions to illustrate their mechanical arrangement within the calculator.

A detailed description of the tape advance system 11 is found in copending U.S. patent application Ser. No. 671,804, now U.S. Pat. No. 3,520,459 entitled "Tape Advance System" by John McCrady filed on even date herewith and assigned to the assignee of the present application. Said U.S. patent application by John McCrady is incorporated herein by reference.

Power Supply (17, 18) and Auxiliary Electronics (Module 15)

Figure 13:
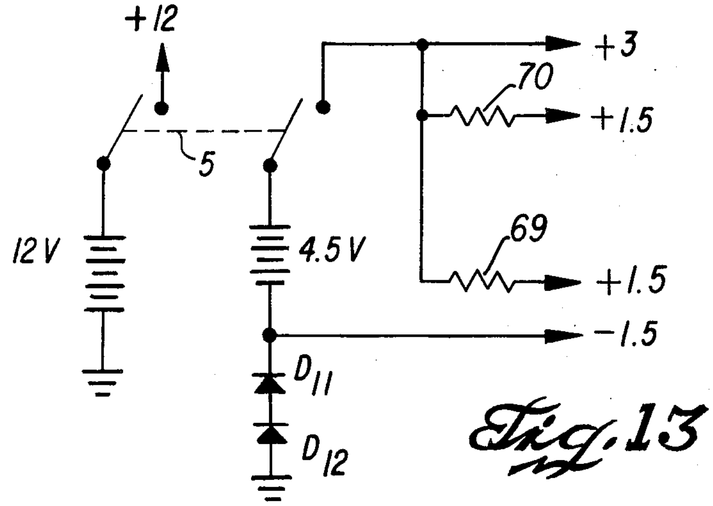

The power supply comprises three 1½ volt batteries 17 connected in series as illustrated in FIG. 2 to provide the 4½ volt power source illustrated in FIG. 13 and eight 1½ volt batteries 18 connected in series as illustrated in FIG. 2 to provide the 12 volt power source illustrated in FIG. 13. Referring to FIG. 13, the 4, 5 volt power source is connected to the auxiliary electronics module 15 and through the switch 5 corresponding to switch 5 illustrated in FIGS. 1 and 2 to the primary electronics 7, which will be described later.

Figure 9:
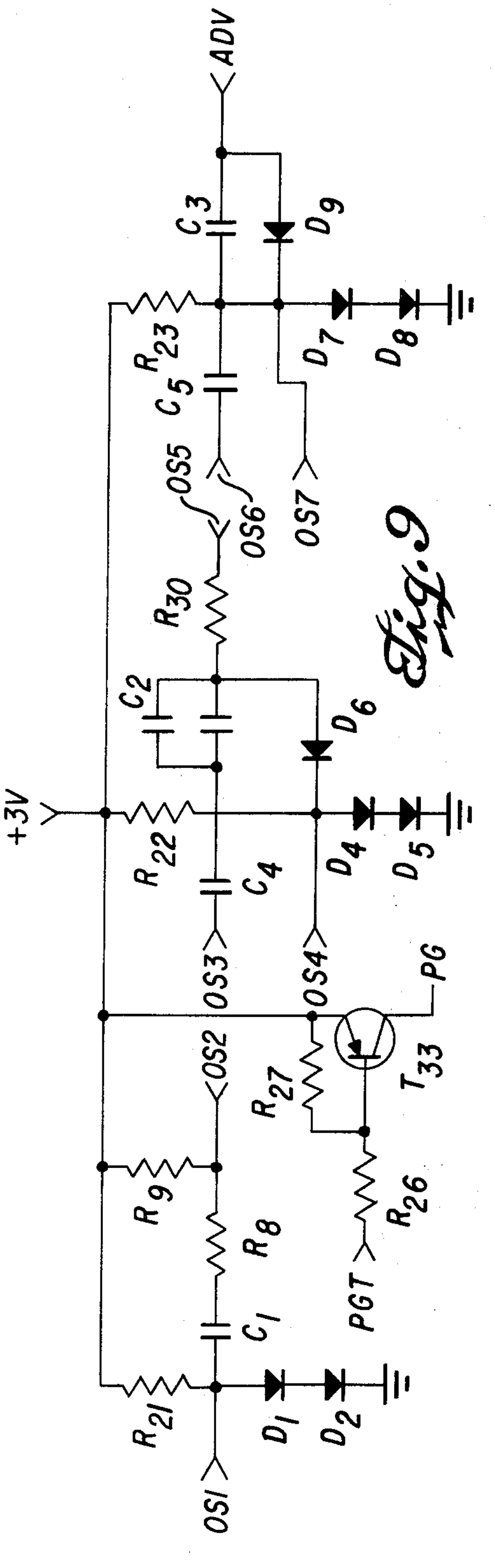
FIGS. 9–13 illustrate the power supply and auxiliary electronics of the calculator of FIG. 2.
Figure 10:
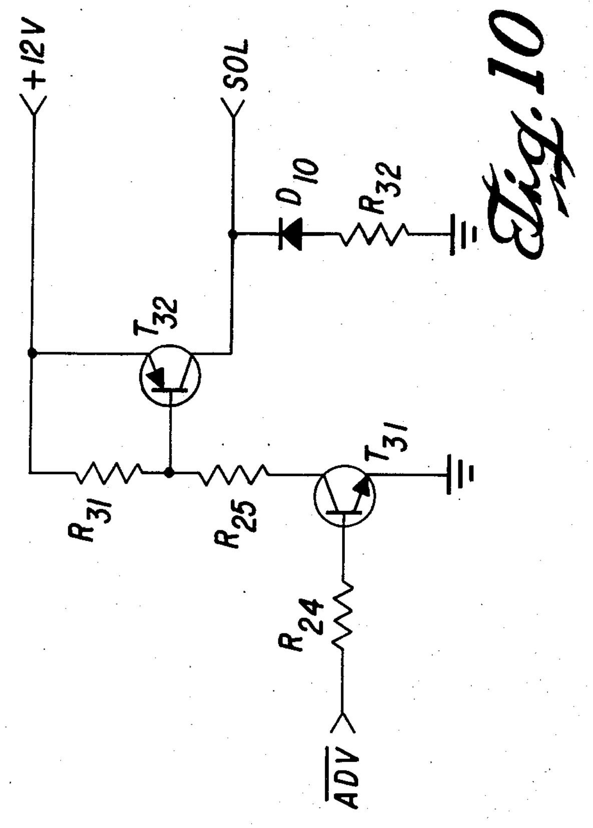
Figure 11:
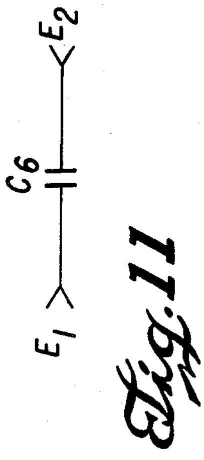
Figure 12:
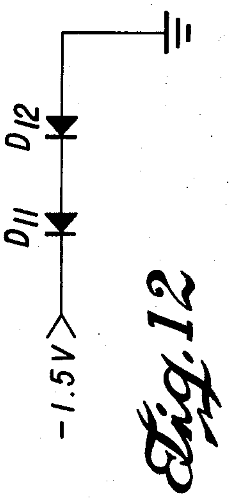

The auxiliary electronics module 15 contains the circuit components and their interconnections as is illustrated in FIGS. 9-12. Referring of FIG. 9, the terminal marked +3 volts is connected to the +3 volt terminal illustrated in FIG. 13, and the terminals marked OS 1, OS 2, OS 3, OS 4, OS 5, OS 6, OS 7, PG, PG T, and ADV are connected to the similarly marked terminals of the primary electronics 7 through the connection 12 of FIG. 2 as will be described later. Referring to FIG. 10, the terminal marked +12 volts is connected to the +12 volt terminal of FIG. 13, the terminal marked SOL is connected to the magnetic coil or solenoid 35 of the tape advance system 11 illustrated in FIGS. 2 and 3, and the terminal marked $\overline{ADV}$ is connected to a similarly marked terminal of the primary electronics 7 as will be described later. Referring to FIG. 11, the terminals marked E 1 and E 2 are connected to similarly marked terminals of the primary electronics 7 as will be described later. Referring to FIG. 12, the terminal −1.5 volts is connected to the 4.5 volt power source illustrated in FIG. 13 wherein the diodes D 11 and D 12 of FIG. 12 are also illustrated.

The interconnected circuit elements of FIG. 9 supply the R-C time delay networks for three one-shot multivibrators used in the printing sequence to be described later. The circuit of FIG. 10 provides a buffer for receiving the command $\overline{ADV}$ from the primary electronics and converting it into the appropriate voltage SOL for application to the magnetic coil 35.

Primary Electronics 7

The primary electronics of the calculator is embodied in an integrated semiconductor circuit array located in substantially one plane. The integrated semiconductor circuit array comprises the control and arithmetic sections of the calculator for performing the arithmetic operations of the numbers entered into the calculator and generating the control and timing signals for appropriately carrying out the arithmetic operations, the printout of the entry data and answers and the advancement of the tape. The integrated semiconductor circuit array is mounted parallel with the keyboard encoder 6 so that they occupy generally parallel planes one above the other in a manner that the entry encoding and control and arithmetic operations of the calculator are accomplished in a very small compact space.

The various key entries are made, electrically encoded by the keyboard encoder 6 and transmitted to the integrated semincoductor circuit array where the various arithmetic calculations are made and control signals generated for appropriately commanding the thermal printer 4 and the tape advance system 11.

Figure 14:
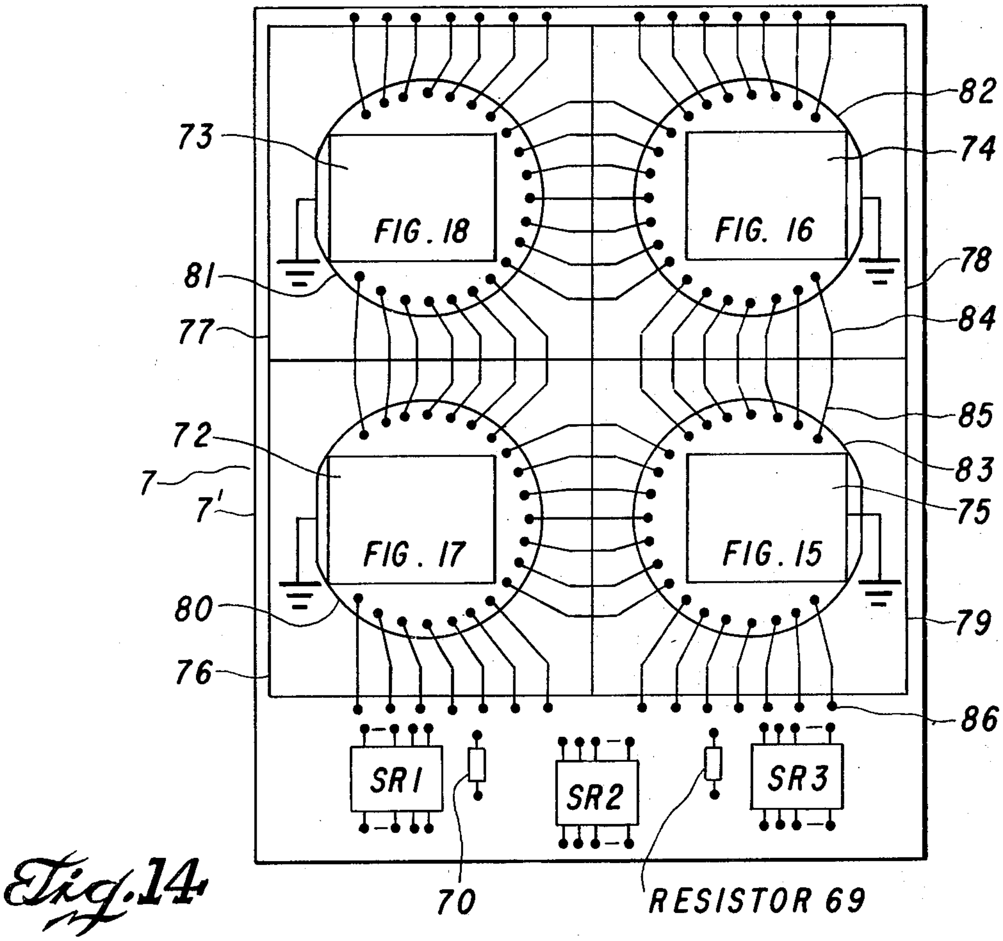
FIG. 14 illustrates the integrated semiconductor circuit array comprising the primary electronics 7 of the calculator of FIG. 2.

The integrated seminconductor circuit array is illustrated in FIG. 14 and comprises four integrated semiconductor circuits placed in the areas designated 73–75, three integrated semiconductor shift registers SR 1, SR 2, and SR 3 and two resistors 69, 70 all interconnected and arranged on the insulating substrate 7′ in the manner to be described.

Figure 15:
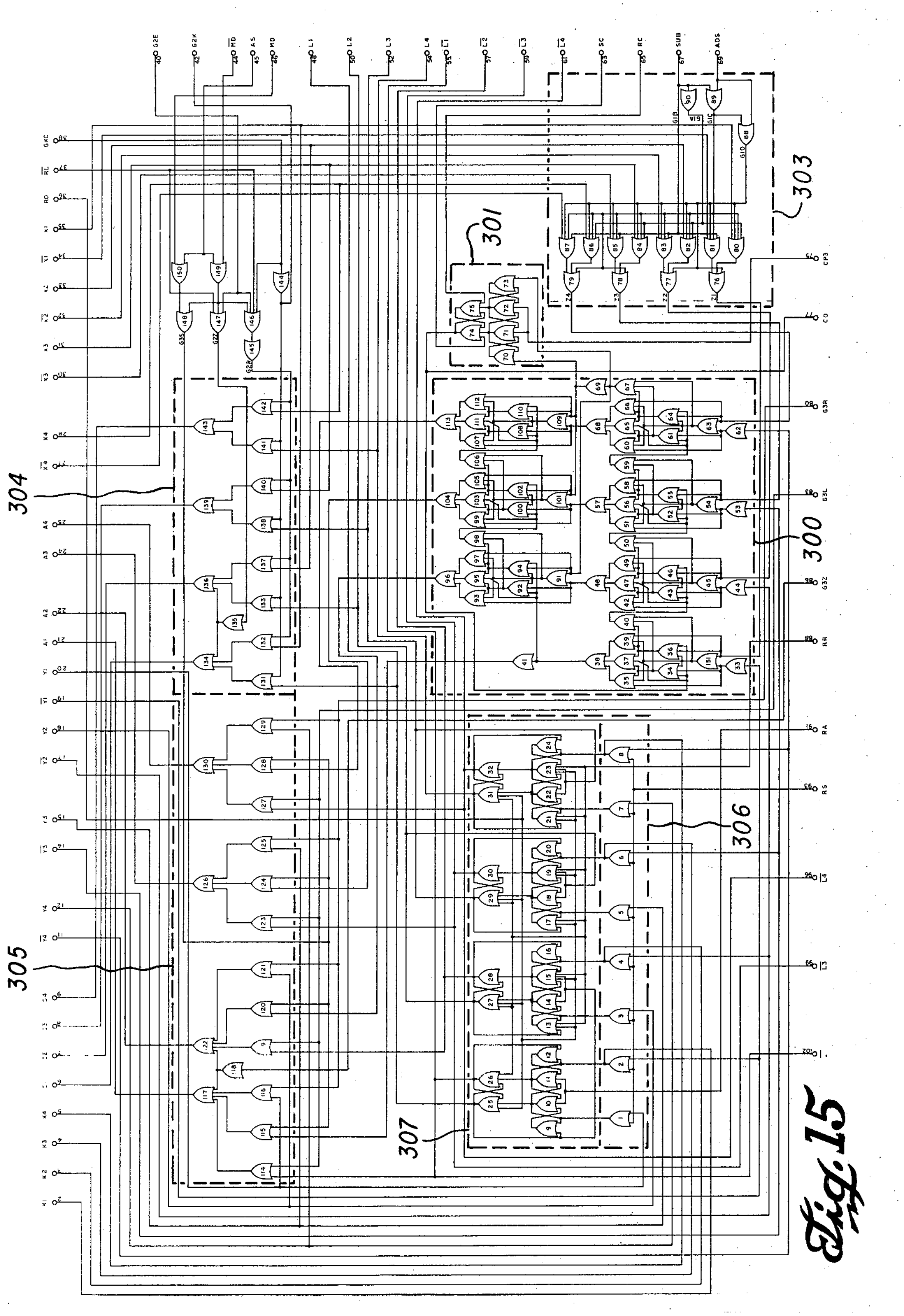
FIGS. 15–18 illustrate the logic circuitry of the integrated semiconductor circuit array of FIG. 14.
Figure 16:
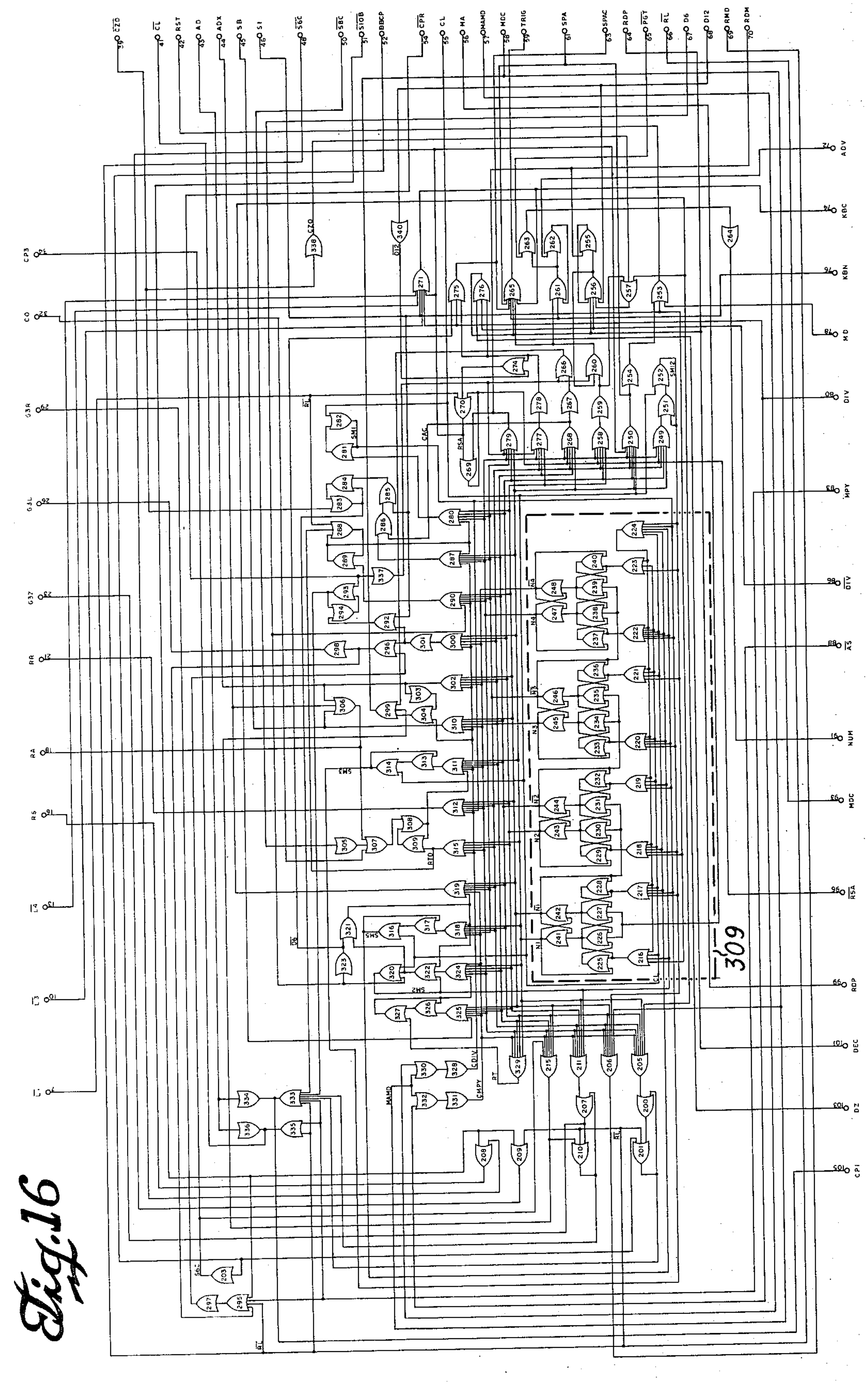
Figure 17:
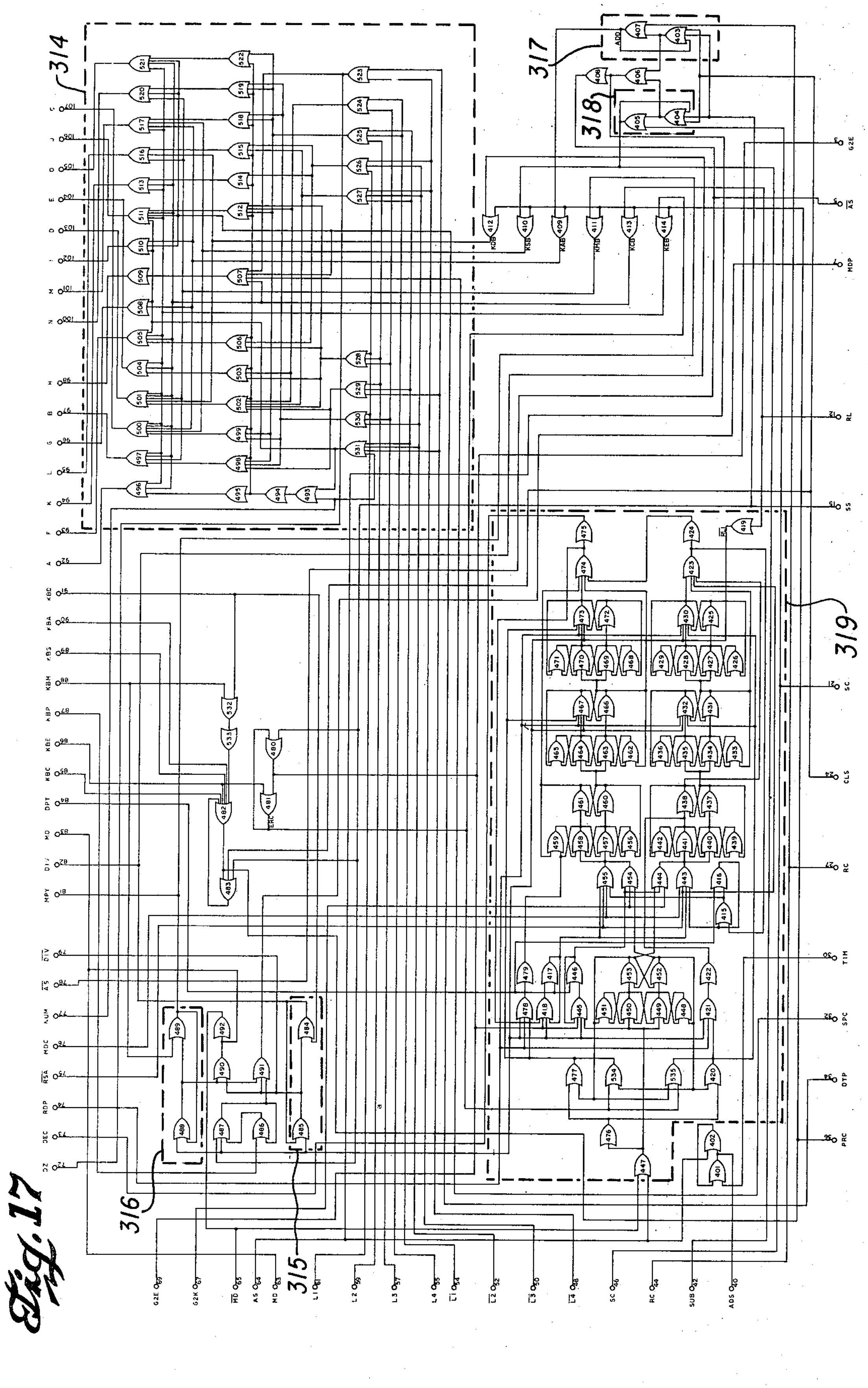
Figure 18:
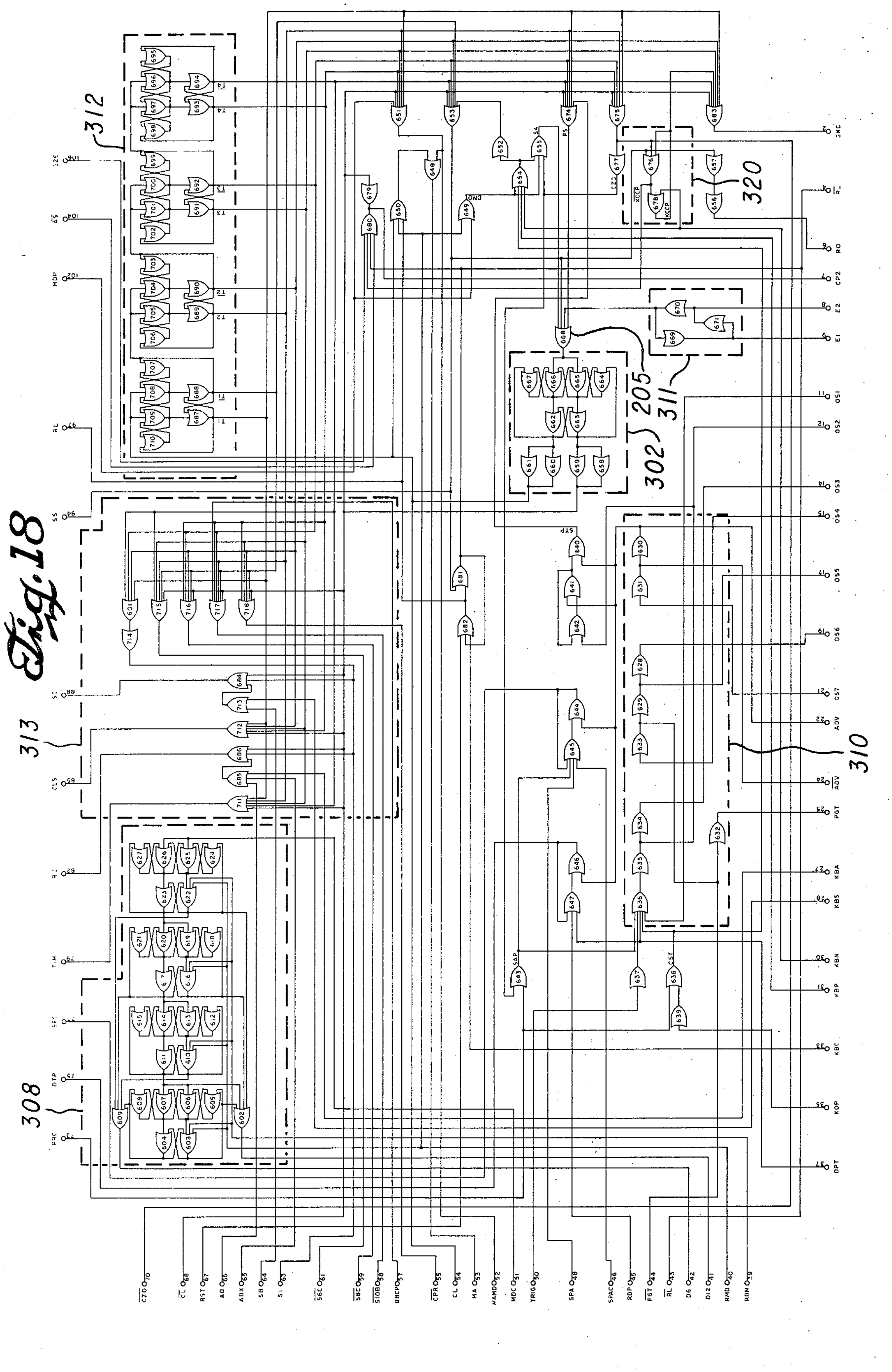

FIG. 15 illustrates a logic diagram having 151 functional unit NAND gates interconnected in the manner illustrated and embodied in the integrated semiconductor circuit whose substrate is mounted in the area designated 75 in FIG. 14. FIG. 16 illustrates a logic diagram having 132 functional unit NAND gates interconnected in the manner illustrated and embodied in an integrated semiconductor circuit whose substrate is mounted in the area designated 74 in FIG. 14. FIG. 17 illustrates a logic diagram having 135 functional unit NAND gates interconnected in the manner whose substrate is mounted in the area designated 72 in FIG. 14. FIG. 18 illustrates a logic diagram having 116 functional unit NAND gates interconnected in the manner illustrated and embodied in an integrated semiconductor circuit whose substrate is mounted in the area designated 73 in FIG. 14.

Each NAND gate of FIGS. 15–18 is identically constructed and comprises the circuit illustrated in FIG. 20. The NAND gate contains 6 PNP transistors, 2 NPN transistors, and 2 resistors interconnected in the manner illustrated in FIG. 20 with 6 input terminals, a ground terminal and a collector voltage terminal +3 volts. Transistor T 35 has its collector and base electrodes short circuited and acts as a PN junction diode connected between resistor R 33 and the base of transistor T 34; the emitters of the PNP transistors are connected to the base of transistor T 35 and their collectors are connected to ground, so that when a zero or ground appears at any of the input terminals, a PNP transistor is conducting and transistor T 35 is reversed biased, causing transistor T 34 to be off and the output terminal, to be in the high, or one, state. When ones, or positive voltages appear at all the input terminals, the reverse bias is removed from transistor T 35, which turns transistor T 34 on drawing current through resistor R 33A which causes the output terminal to be in the low or zero state. Not all of the input terminals of the circuit of FIG. 20 are used by all of the gates of FIGS. 15–18 and only those input terminals which are used are illustrated in FIGS. 15–18. For example, referring to FIG. 15, gates 1–8 within the block 306 each utilize two input terminals, while gates 80–87 within the block 303 each utilize four input terminals.

Moreover, the functional unit NAND gates in some instances are interconnected, one NAND gate with another, to form multivibrators and counters such as the NAND gates interconnected as illustrated within the block 317 of FIG. 17 to form a flip-flop and the NAND gates interconnected as illustrated within the block 312 of FIG. 18 to form a 16 position counter.

Each integrated semiconductor circuit emobdying the logic circuits of FIGS. 15–18 is formed in the surface of a silicon substrate of P-type conductivity of the desired resistivity utilizing the planar process in which a silicon oxide film is thermally grown on the silicon substrate by placing it in a furnace at an elevated temperature and passing an oxidizing agent over it. The resulting silicon oxide film acts as a masking medium against the impurities which are later diffused into the substrate. Holes are produced in the oxide film to allow subsequent diffusion processes to form the transistors, resistors, and PN junction isolating functions. These holes which are patterns of the desired circuit elements and PN junction isolating regions are produced by photolithographic techniques. Contacts and interconnections between the circuit elements are made by similar photolithographic techniques using for example a molybdenum-gold-molybdenum (Mo-Au-Mo) contact system over the oxide film to form a metallic pattern connecting the circuit elements together in the circuit configuration of FIG. 20, thereby forming the NAND gates which are to be interconnected in the logic circuits of FIGS. 15–18. The metallic pattern comprises conductive strips on the oxide film extending onto openings in the oxide film for connecting the circuit elements into the circuit configuration of FIG. 20 and comprises contact areas which are to be interconnected to result in the logic circuits of FIGS. 15–18.

Figure 29:
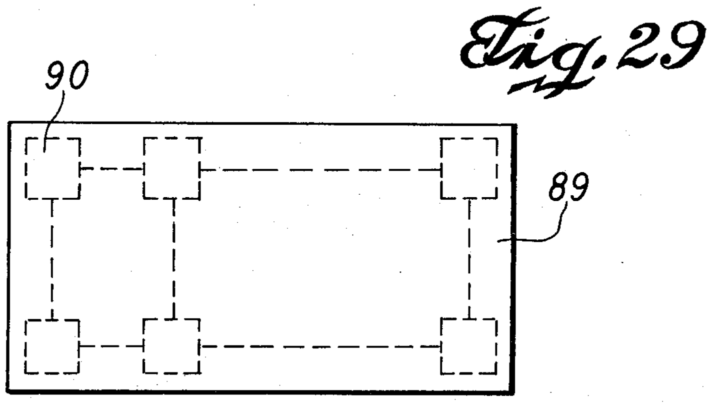
FIG. 29 illustrates an integrated semiconductor circuit embodying the logic circuits of FIGS. 15–18.
Figure 31:
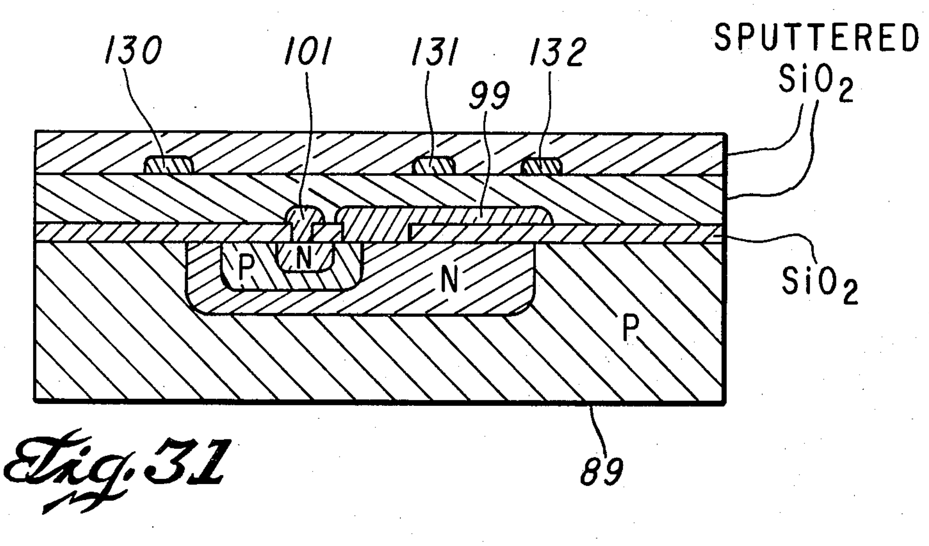
FIG. 31 illustrates a cross section of FIG. 30 taken along the lines A—A.
Figure 30:
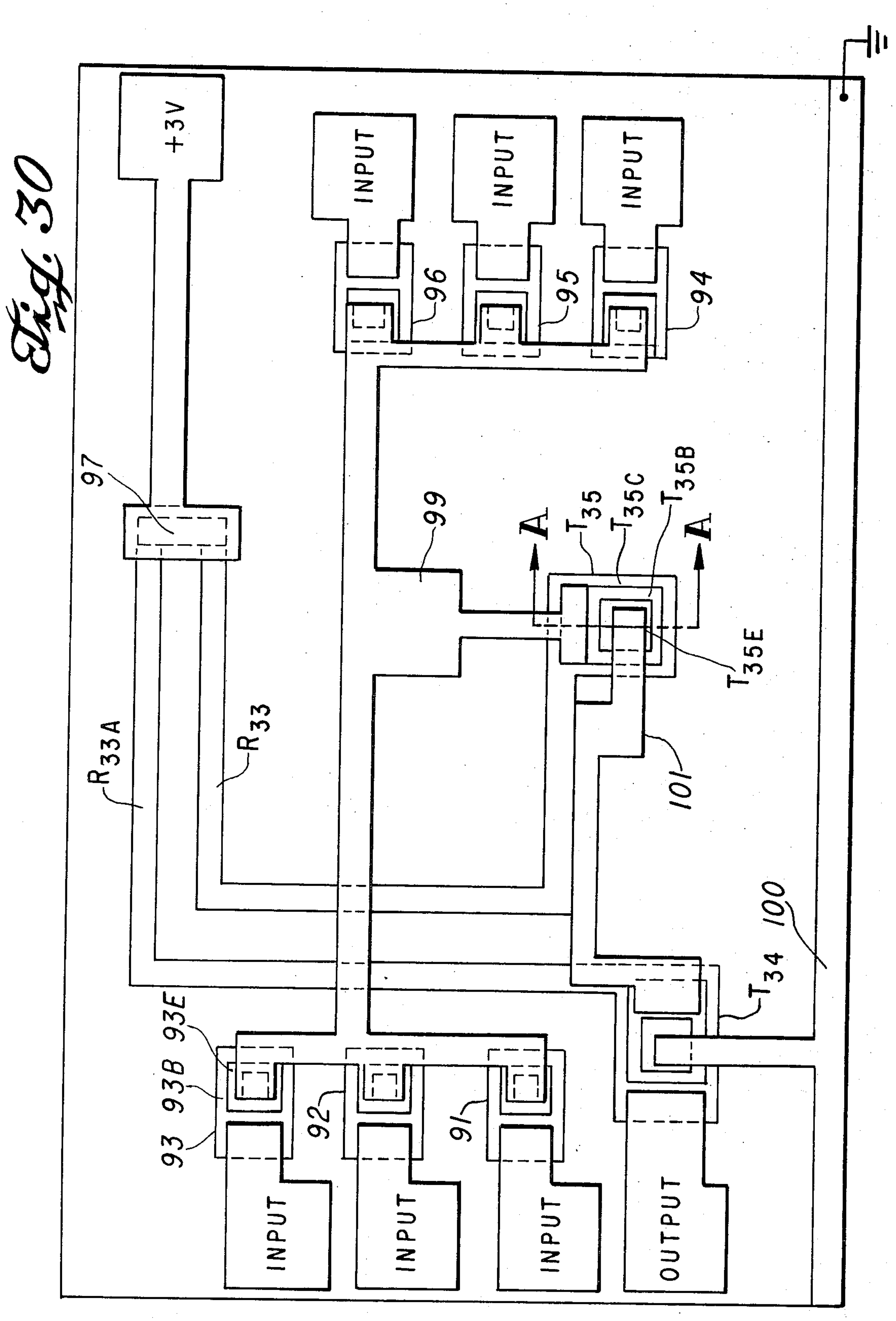
FIG. 30 illustrates the gate 90 of FIG. 29.

FIG. 29 illustrates the P-type silicon substrate 89 of desired resistivity on whose surface the NAND gates 90 are formed. FIG. 30 illustrates the top view of one of the NAND gates 90 formed on the surface of the substrate 89 and the metallic interconnection pattern interconnecting the circuit elements of the NAND gate in the desired configuration of FIG. 20. The NAND gate 90 comprises six double diffused PNP transistors 91 through 96 two triple diffused NPN transistors T 34, T 35 and a diffused N-type resistor R 33, R 33A having a center tap 97 for the application of the +3 volts. The P-type collectors of the transistors 91 through 96 are integral and all interconnected within the P-type substrate 89 while the P-type substrate 89 is connected to ground by the metallic strip 100 ohmically engaging the top semiconductor surface of the substrate 89. The PNP transistor 93 for example comprises as its collector the P-type substrate 89, the N-type diffused base region 93B and the P-type diffused emitter region 93E. The construction of the other PNP transistors of the NAND gate 90 are the same. The construction of the transistors T 34 and T 35 are similar and T35 comprises the diffused N-type collector region T 35C which is diffused at the same time as the N-type diffused resistors R 33, R 33A, the N-type collector of T 34 and the N-type base regions of transistors 91–96. Transistor T 35 further comprises the diffused N-type emitter region T 35E. The emitters of transistors 91–96 are all connected together and connected to the base of transistor T 35 by conductive strip 99. Referring to FIG. 31 it can be seen that the conductive strip 99 short circuits the collector-base PN junction of transistor T 35. The emitter of transistor T 35 is connected to the base of transistor T 34 by conductive strip 101. Expanded metallic contacts terminating in enlarged contact areas and labeled input in FIG. 30 are connected respectively to the base zones of the transistors 91–96. An expanded metallic contact terminating in an enlarged contact area and labeled output is connected to the collector electrode of transistor T 34. Accordingly, the NAND gate 90 is interconnected in the circuit configuration of FIG. 20 and there are 6 metallic contact areas on the silicon oxide film for the input terminals (input), a metallic contact area on the silicon oxide film for the ground connection (strip 100), a metallic contact area on the silicon oxide film for the output connection (output), and a metallic contact area on the silicon oxide film for the application of the + 3 volts (+3 volts). The circuit elements of each NAND gate of the integrated semiconductor circuit are interconnected in this manner at a first level of interconnections.

FIG. 31 illustrates a cross section of FIG. 30 taken along the line A—A. Referring to FIG. 31 there is illustrated the triple diffused NPN transistor T 35, the silicon oxide film $SiO_2$ on the surface of the silicon substrate 89, and first level metal contacts 99 and 101 extending into openings in the silicon oxide film and connecting to the emitter and shorting the collector base PN junction. Additionally shown in FIG. 31 are second and third levels of interconnections represented by second and third insulating layers labeled sputtered $SiO_2$. After the circuit elements are interconnected to form the separate NAND gates, the NAND gates are then electrically interconnected at a second and third level of interconnection to form the logic circuits of FIGS. 15–18. Conductive strips are provided in one direction at the second level of interconnections, for example North-South and conductive strips are provided at a perpendicular direction East-West at a third level of interconnections to interconnect the NAND gates into the logic circuits of FIGS. 15–18. FIG. 31 illustrates the second level of interconnection provided by an insulating film over the first level of interconnections and the conductive strips 130, 131, and 132 extending in one direction. Thereafter a third layer of insulating material is provided over the second level of interconnections and conductors are provided thereon extending in a perpendicular direction to the second level conductors. The second and third level insulating films may be RF sputtered silicon dioxide and similar photographic techniques may be utilized to form openings in the RF sputtered silicon dioxide and expose the contact areas for interconnecting the NAND gates.

A detailed description of the processes of forming the interconnected functional unit NAND gates at a first level of interconnections and interconnecting the NAND gates in the desired logic configuration at a higher level of interconnection is found in copending patent application Ser. No. 645,539, now U.S. Pat. No. 3,643,232, filed June 5, 1967, entitled "Method of Making Semiconductor Devices" by Jack S. Kilby (which was a continuation of Ser. No. 420,031, filed Dec. 21, 1964, now abandoned) which is assigned to the assignee of the present application. Said copending patent application by Jack S. Kilby is incorporated herein by reference.

A detailed description of the molybdenum-gold-molybdenum multi-level contact system for interconnecting circuit elements of an integrated semiconductor circuit is found in copending patent application Ser. No. 606,064, filed Dec. 30, 1966, entitled "Ohmic Contact and Multi-Level Interconnection System for Integrated Circuits" by Clark et al. and assigned to the assignee of the present application, said application Ser. No. 606,064 having been abandoned and refiled Jan. 2, 1969 as Ser. No. 791,862, now U.S. Pat. No. 3,581,161. Said copending patent application Ser. No. 606,064 (and resulting Patent) by Clark et al is incorporated herein by reference.

Accordingly, four integrated semiconductor circuits are formed embodying respectively the logic circuits of FIGS. 15-18 and having terminals or contact pads on the third level insulating film around the periphery of the silicon substrate corresponding respectively to the terminals around FIGS. 15–18. For example, referring to FIG. 15, the terminals or contact pads of the integrated semiconductor circuit correspond to the terminals marked K 1, K 2, . . . RL, GKC, G2E, . . . ADS, CP 3, . . . L1.

Referring to FIG. 14, the integrated semiconductor circuit array comprises an insulating substrate 7′ having printed conductors on its top and bottom surface in order to effect the desired interconnections between the integrated semiconductor circuits. Four insulating plates 76, 77, 78 and 79 respectively having apertures therein 80, 81, 82 and 83 are mounted side by side on the insulating substrate 7′ over some of the printed conductors on the top surface of the insulating substrate 7′. The insulating plates 76, 77, 78 and 79 have respective apertures therein 80, 81, 82 and 83 for respectively accommodating the integrated semiconductor circuits embodying the logic circuits of FIG. 17, 18, 16 and 15. Patterned conductors 84, 85, 86 are applied onto the top surface of the insulating plates 76, 77, 78 and 79 and overhang into the apertures 80, 81, 82 and 83 and onto the top surface of the insulating substrate 7′.

The insulating plate 76 for example, its associated patterned conductors and integrated semiconductor circuit are assembled as follows: An insulating plate 76 having an aperture 80 is provided. A thin continuous sheet of metal is bonded onto the top surface of the insulating plate 76 such that the metal sheet extends over the opening 80 and extends over one side of the insulating plate 76. Photoresist material is applied over both sides of the metal sheet and the photoresist material on the top side of the metal sheet is then patterned and the metal sheet etched such as by conventional photolithographic and etching techniques to form lead strips overhanging the opening 80 and overhanging one side of the insulating plate 76 i.e. the side adjacent SR 1. The semiconductor circuit having its three levels of interconnections is inserted into the opening 80 from the bottom of the insulating plate 76 and the bonding pads on the surface of the third level of interconnections are aligned with and bonded to the overyhanging lead strips utilizing conventional ultrasonic bonding techniques for example. The thickness of the semiconductor substrate of the integrated semiconductor circuit is less than the thickness of the wall of the opening 80 in the insulating plate 76 so that the bottom of the semiconductor substrate does not touch the top surface of the insulating substrate 7′ when the insulating plate 76 is mounted thereon. Alternately, an insulating layer may be provided on the bottom surface of the semiconductor substrate so that it is electrically isolated from any printed conductors on the top surface of the insulating substrate 7′ that may extend between the semiconductor substrate and the top surface of substrate 7′.

The integrated semiconductor circuits embodying the logic circuits of FIGS. 15 and 17 are respectively mounted within the openings 83 and 80 in the manner that terminals ADS, SUB, . . . G2K, G2E, of FIGS. 15 are adjacent the corresponding terminals ADS, SUB, . . . G2K, G2E of FIG. 17. The integrated semiconductor circuits embodying the logic circuits of FIGS. 16 and 18 are respectively mounted within the opening 82 and 81 in a manner that the terminals RDM, RMD, . . . $\overline{CL}$, $\overline{CZO}$ of FIG. 16 are adjacent the corresponding terminals RDM, RMD, . . . $\overline{CL}$, $\overline{CZO}$ of FIG. 18. Consequently, the terminals L 1, L 3, . . . CO, CP 3 of FIG. 15 are adjacent the corresponding terminals L 1, L 3, . . . CO, CP 3 of FIG. 16 and the terminals PRC, DTP, . . . AS, G2E of FIG. 17 are adjacent the corresponding terminals PRC, DTP, . . . AS, G2E of FIG. 18.

The assembled insulating plates 76–79, patterned conductors 84, 85, 86, and integrated semiconductor circuits are then mounted side by side on the top surface of the insulating substrate 7′ as illustrated in FIG. 14. Each integrated semiconductor circuit comprises a plurality of horizontal rows of NAND gates and a like plurality of conductive ground strips 100. See FIGS. 29 and 30. At the third level of interconnections all the rows of ground strips are interconnected by an overlying perpendicular ground strip which is brought out to a patterned conductor ground strip on the insulating plate which is schematically illustrated as the ground connection on each of the insulating plates 76–79. The patterned conductors 84, 85, are respectively connected to each other at the interfaces of the insulating plates 76–79 and the patterned conductors 86 overhanging the insulating plates 76–79 onto the top surface of the insulating substrate 7′ are connected to printed conductors on the top surface of the insulating substrate 7′.

Accordingly, the bonding or contact pads on the third level of interconnections of the integrated semiconductor circuits are electrically connected to the similarly marked terminals of FIGS. 15–18 by way of the patterned conductors 84, 85 while the terminals K 1, K 2, . . . $\overline{RL}$, GKC of FIG. 15, the terminals DZ, DEC, . . . J, C of FIG. 17, the terminals DPT, KOP, . . . $\overline{RL}$, GKC of FIG. 18 and the terminals CP 1, DZ, . . . KBC, ADV of FIG. 16 are electrically extended to the top surface of the substrate 7′ at the terminals 86 and similarly marked terminals are interconnected by printed conductors on the substrate 7′.

A detailed description of the assembly and mounting of an insulating plate 76 for example, its overhanging patterned conductors and associated integrated semiconductor circuit is found in copending patent application Ser. No. 568,799 filed July 29, 1966 entitled "Process for Packaging Multi Lead Semiconductor Devices and REsulting Products" by Jack S. Kilby et al, now U.S. Pat. No. 3,484,534, which is assigned to the assignee of the present application. Said copending patent application by Jack S. Kilby et al. is incorporated herein by reference.

Figure 22:
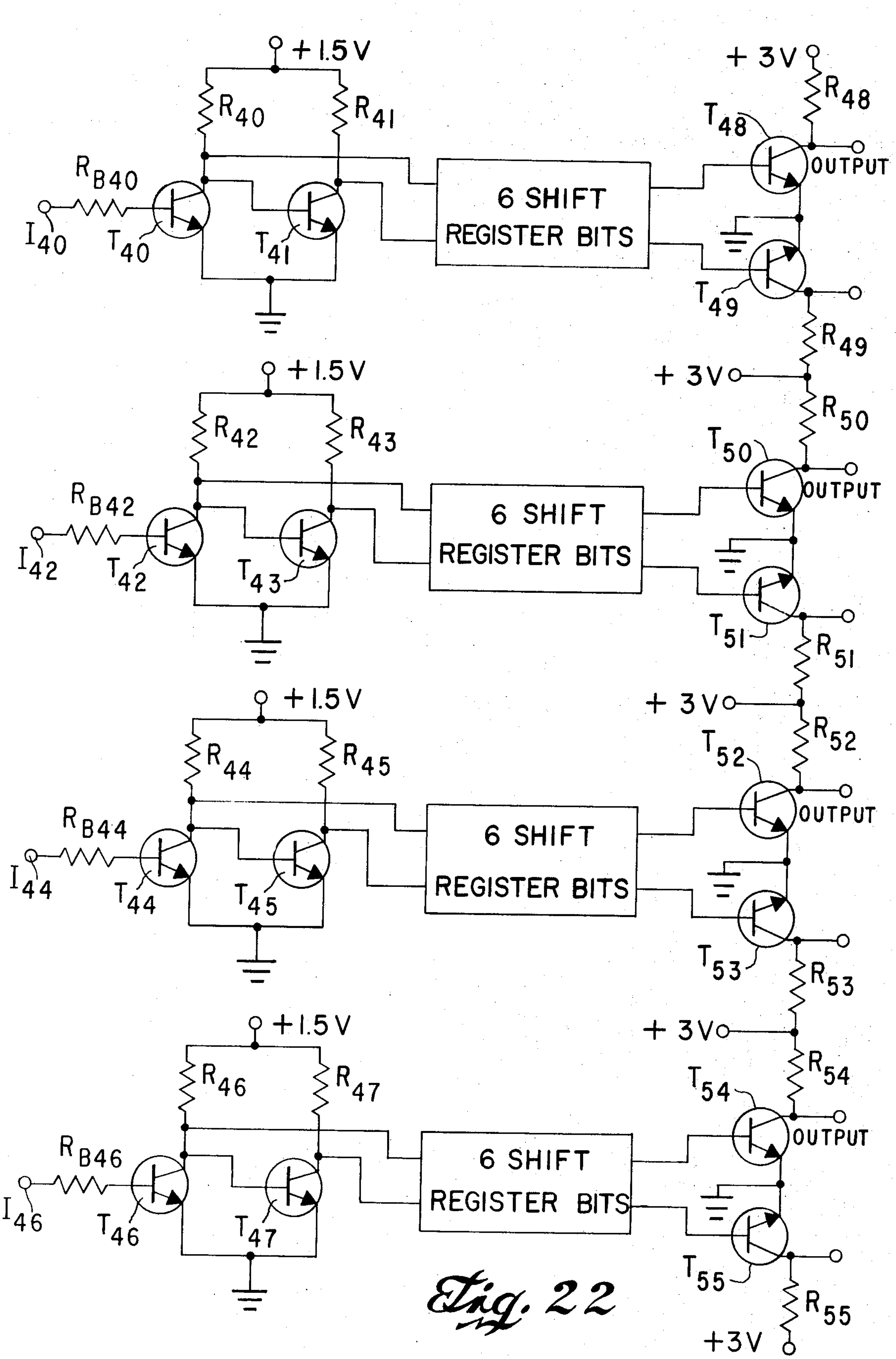
FIG. 22 illustrates a 24 bit shift register of the integrated semiconductor circuit array of FIG. 14.

The primary electronics 7 additionally contains three 24-bit shift register SR 1, SR 2, and SR 3. These shift registers are identical and each one contains four 6-bit rows in parallel so that the four binary bits representing a numeric entry are entered in parallel and associated input/output circuitry as illustrated in FIG. 22. Therefore, each shift register, SR 1, for example, contains the four groups of 6 shift register bits, associated input circuitry T 40 through T 47, R 40 through R 47, and RB 40 through RB 46 associated output circuitry T 48 through T 55 and R 48 through R 55.

A binary 1 or 0 is applied to the input terminals I 40, I 42, I 44, I 46 for entry into the shift register. A binary 1 (positive pulse) at iput terminal 40, for example, turns transistor T 40 on and transistor T 41 off, so that the collector voltage of transistor T 40 is low in realtionship to the collector voltage of transistor T 41 for entering a 1 into the shift register.

Figure 21:
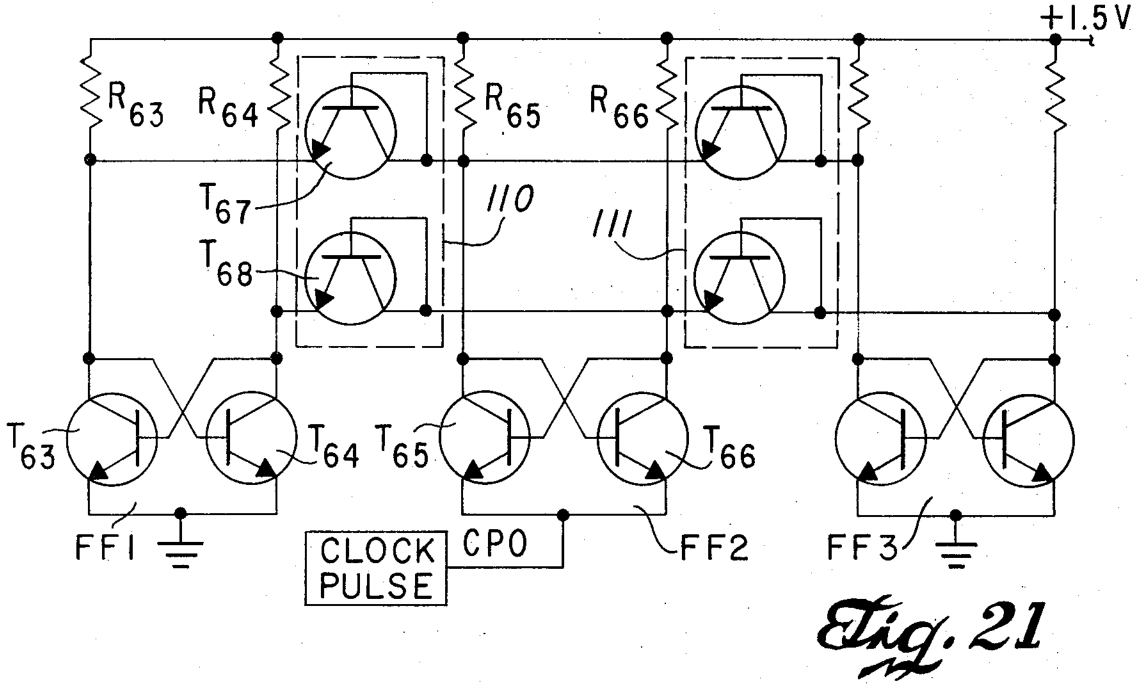
FIG. 21 illustrates a shift register circuit of the integrated semiconductor circuit array of FIG. 14.

The circuitry of the shift register is illustrated in FIG. 21, wherein the binary information entered into one storage unit flip flop FF 1 is transferred to another succeeding storage flip flop FF 3 by means of the intermediate storage unit flip flop FF 2 under control of the clock pulse CPO. Binary information is transferred from one storage unit to another in the shift register by two phase clocking action, whereby under one condition of the clock pulse, CPO, the binary information in storage unit FF 1 is transferred to intermediate storage unit FF 2 and under a second condition of the clock pulse CPO, the binary information is transferred out of the intermediate storage unit FF 2 into the succeeding storage unit FF 3. One bit of the shift register comprises the storage unit FF 1, and the intermediate storage unit FF 2. Gates 110 and 111 are arranged between a storage unit FF 1, or FF 3 and an intermediate storage unit, FF 2, for blocking and permitting electrical communication between the storage units and effecting the transfer of the binary information in the shift register under control of the clocking pulse CPO.

The voltage level of the clock pulse CPO varies from +1 volts to −1 volts, the +1 volt condition being its normal state. When CPO is at +1 volts, the collector voltages of the transistors T 65 and T 66 of the interemediate storage unit FF 2 are positive and cause gate 111 to be in a blocking condition, so that there is no communication between the intermediate storage unit FF 2 and the succeeding storage unit FF 3, while the biasing of gate 110 is such that there is electrical communication between the storge unit FF 1 and the intermediate storage unit FF 2, so that the binary information contained in storage unit FF 1 is transferred to the intermediate storage unit FF 2, When CPO is at −1 volts, the collector voltages of transistors T 65 and T 66 are lowered to cause gate 110 to be in a blocking condition in the manner that there is no electrical communication between storage unit FF 1 and intermediate storage unit FF 2 while gate 111 is unblocked and allows electrical communication between intermediate storage unit FF 2 and storage unit FF 3 thereby transferring the binary information out of intermediate storage unit FF 2 into storage unit FF 3. Thus, clock pulse CPO controls the transfer of binary information from one storage unit to another.

A detailed description of the shift register circuit of FIG. 21 is found in copending U.S. Patent application Ser. No. 650,832 filed July 3, 1967, entitled, "Information Transfer System" by Jerry D. Merryman, now U.S. Pat. No. 3,573,754, which application is assigned to the assignee of the present application. Said copending U.S. patent application by Jerry D. Merryman is incorporated herein by reference.

Four binary bits are applied in parallel to the input terminals I 40, I 42, and I 44 and I 46 and through the respective input circuitry of FIG. 22 to the first storage unit of each of the four 6-bit shift registers of FIG. 22.

Figures 23, 24, 25:
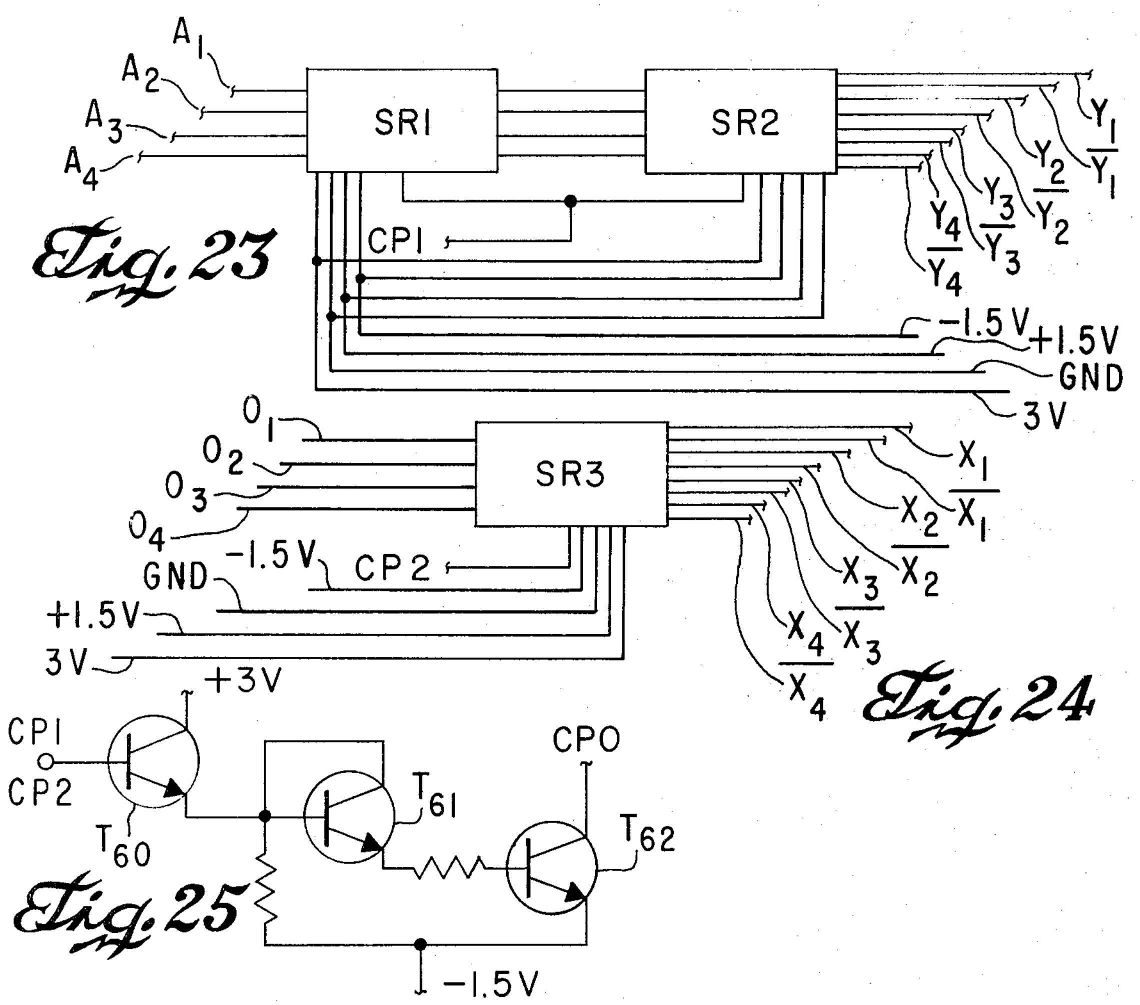
FIG. 23 illustrates the interconnection of two 24 bit shift registers of the integrated semiconductor circuit array of FIG. 14.
FIG. 24 illustrates one 24 bit shift register of the integrated semiconductor circuit array of FIG. 14.
FIG. 25 illustrates the clock pulse circuit of a shift register of the integrated semiconductor circuit array of FIG. 14.

Referring to FIG. 25, the clock pulse output CPO is applied to the emitters of the intermediate storage units FF 2 between a preceeding FF 1 and succeeding FF 3 storage unit of each of the four rows of storage units in each shift register. A command signal CP 1 or CP 2 which will be described later, is applied to the input of the clock pulse circuit to change the normal +1 volt condition of CPO to −1 volt. Transistors T 60, T 61 and T 62 are normally non-conducting and upon the application of a positive pulse CP 1, or CP 2, they are turned on, causing the collector voltage of T 62 to become −1 volt. Each integrated semiconductor shift register circuit SR 1, for example, comprises the four rows of 6 bits and associated input, output circuitry of FIG. 22 and the clock pulse circuit of FIG. 25. Each identical shift register SR 1, SR 2, and SR 3 is fabricated utilizing the planar process as previously described, triple diffusion to form the NPN transistors a single level metallic interconnection pattern over the silcon oxide film and conductive tunnels in the surface of the semiconductor substrate at the places where conductive pathways cross over one another as is described in said aforementioned copending U.S. patent application by Jack S. Kilby, and said aforementioned copending U.S. patent application by Jerry D. Merryman.

Figures 32, 33:
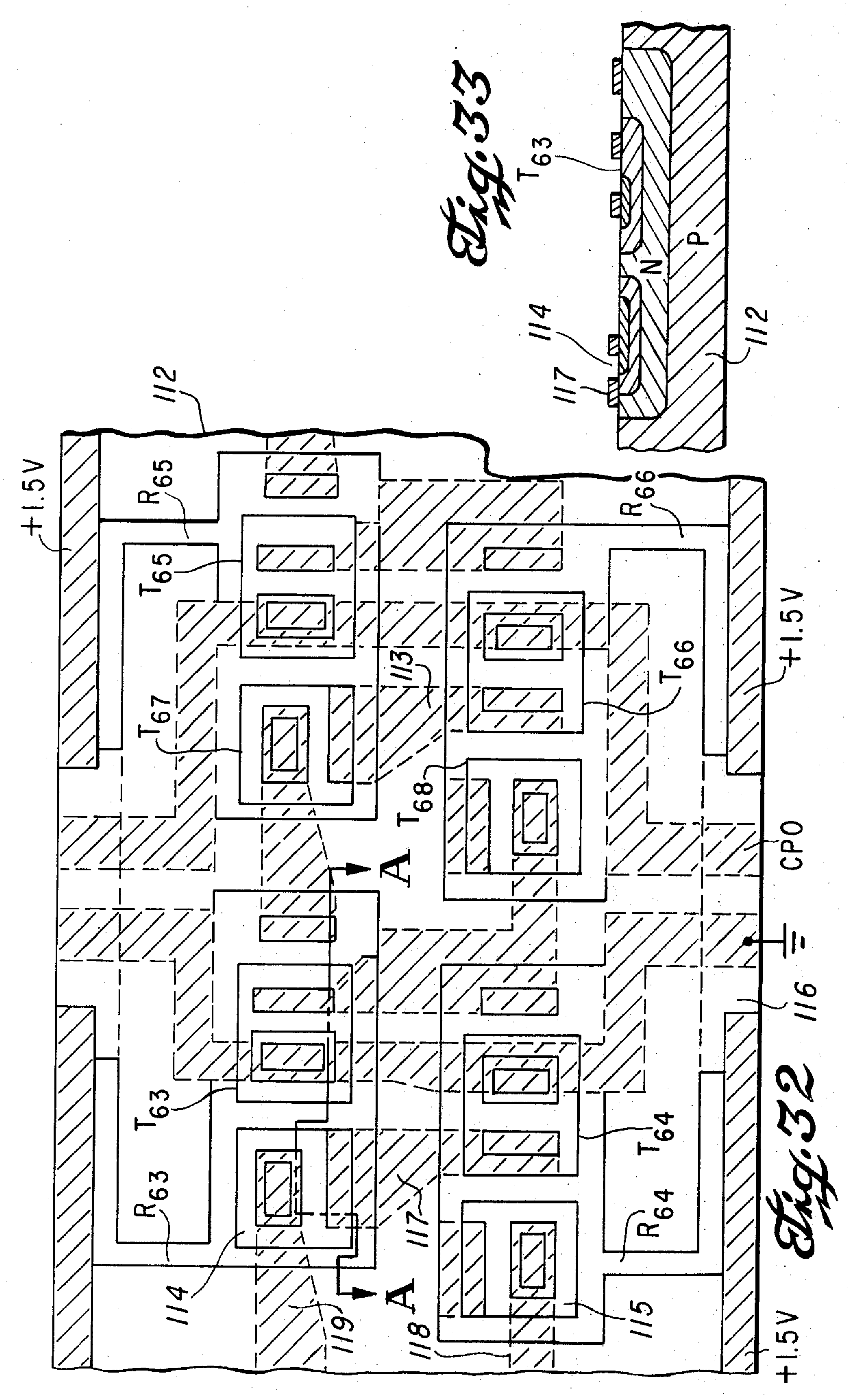
FIG. 32 illustrates an integrated semiconductor shift register of the integrated semiconductor circuit array of FIG. 14.
FIG. 33 illustrates a cross section of FIG. 32 taken along the line A—A in FIG. 32.

FIG. 33 illustrates the partial top view of an integrated semiconductor shift register embodying the storage unit FF 1, gate 110 and intermediate storage unit FF 2 of FIG. 21 in the surface of a P-type silicon substrate 112 of desired resistivity. The 24 bits of the shift register are similarly incorporated in the integrated semiconductor circuit. Referring to FIG. 32, there is illustrated the NPN triple diffused transistors T 63 –T 66 and the triple diffused NPN gate transistors T 67 and T 68. A storage unit transistor T 65, for example, and a corresponding gate transistor T 67, for example, are formed within a common N-type diffused collector region in the manner that the resistor R 65 has one end ohmically connected to the collector region of transistors T 65 and T 67 within the semiconductor material. All the corresponding storage unit transistors, gate transistors and resistors are similarly constructed in the surface of the semiconductor material. Each gate transistor T 67, for example, has its collector-base PN junction short circuited by conductive strip 113. Gate transistors 114 and 115 are illustrated as being formed within the respective collector regions of storage unit transistors T 63 and T 64. These gate transistors provide the input to the storage unit comprised of transistors T 63 and T 64 in the manner that the collector voltages of the input circuitry, transistors T 40 and T 41 of FIG. 22, are connected respectively to the collector electrodes of transistors T 63 and T 64 by means of the conductive strips 119 and 118.

The metallic interconnection pattern over the silicon oxide film on the surface of substrate 112 comprises conductive strips 113, 117, ground, CPO, interconnecting the circuit elements in the desired circuit configuration. The heavily doped diffused N type conductive tunnel 116 in the surface of the substrate 112 interconnects the two ends of the metallic strips +3 volts, so that the conductive strips, ground and CPO can cross over the conductive tunnel 116, in a manner to allow the 24 bits, gates and clock pulse circuit of the shift register to be interconnected at one level on the silicon oxide film.

FIG. 33 illustrates a cross section of FIG. 32 taken along the lines A—A to show the triple diffused transistors T 63 and 114, having a commmon N type diffused collector region and conductive strip 117 short circuiting the collector-base PN junction of transistor 114.

The metallic interconnection pattern on the silicon oxide film on substrate 112 comprise enlarged contact areas for making external connections to the integrated semiconductor circuit. There are 17 contact areas on the surface of the silicon oxide film comprising the terminals for '1.5 volts corresponding to the similarly marked +1.5 volt terminals of FIG. 21 and FIG. 22, −1.5 volts corresponding to the similarly marked terminals of FIG. 25, CP 1 or CP 2 corresponding to the similarly marked terminal of FIG. 21, and FIG. 22, I 40, I 44, and I 46 corresponding to the similarly marked terminals of FIG. 22, and 8 output terinals corresponding to the similarly marked terminals of FIG. 22 and +3 volts corresponding to the similarly marked terminals of FIG. 22 and FIG. 25. The three integrated semiconductor shift registers are encapsulated in a flat package construction with 17 coplanar flat leads respectively connected to the 17 contact areas extending out of the sides of the flat package as is well known in the art.

Referring to FIG. 14, the 3 integrated semiconductor shift registers SR 1, SR 2, and SR 3 are mounted on the surface of the substrate 7′ and their leads connected to printed conductors on the substrate 7′ to effect the desired interconnections between the shift registers and the other components of the primary electronics 7.

Resistors 69–70 are also mounted on the insulating substrate 7′. Referring to FIG. 13, the 4.5 power source is connected through resistors 69–70 corresponding to the similarly marked resistors 69–70 of FIG. 14 to respectively supply the 1.5 volts to the shift registers SR 1, SR 2, through resistor 70 and to SR 3 through resistor 69. The −1.5 and +3 volt terminals of FIG. 13 are also connected to the corresponding terminals of the shift registers SR 1, SR 2, and SR 3.

In order to illustrate the planar form of the primary electronics, the dimensions of the integrated semiconductor circuit array of the described embodiment are 4⅝ by 4 by ⅛ inches.

Alternatively, the planar integrated semiconductor circuit array may comprise a large integral semiconductor wafer smaller than the insulating substrate 7′ comprising quadrants respectively embodying the logic circuits of FIGS. 15–18. The closely grouped circuit elements comprising each functional unit NAND gate at the surface of the integral semiconductor wafer may be interconnected at a first level of interconnections to form the NAND gate, the NAND gates in each quadrant may be interconnected at multi-levels of interconnections to respectively embody the logic circuits of FIGS. 15–18 and the logic circuits of the quadrants may be interconnected at another level of interconnections using RF sputtered silicon oxide, photolithographic techniques and metal deposition techniques as discussed and remaining interconnections effected by printed conductors on the top or bottom surface of the insulating substrate 7′. Moreover, the integral semiconductor wafer may be made larger so that the shift registers SR 1, SR 2, and SR 3 and the two resistors 69–70 may be incorporated into the surface of the larger integral semiconductor wafer with their interconnections being effected at multi-levels of interconnections and remaining interconnections being effected by printed conductors on the insulating substrate 7′.

Moreover, to further reduce the size of the calculator, the insulating substrate of the keyboard encoder 6 may be integrated with the insulating substrate 7′ of the integrated semiconductor circuit array such that the conductors 32 of the keyboard encoder 6 occupy one plane surface of a common insulating substrate and the integrated semiconductor circuit array occupies the opposite parallel plane surface of the common insulating substrate with interconnections being effected by conductive feed throughs extending vertically through the common insulating substrate between the parallel planes, the keyboard encoder effecting the mechanical to electrical conversion of the key entries which in turn are transmitted to the integrated semiconductor circuit array for the arithmetic calculations and the control signals.

Furthermore, the conductive pattern on the keyboard encoder may be simplified to provide a unique short circuit signal indicative of the particular key entry rather than directly encoding the key entry into the excess three binary code and encoding gates provided in the integrated semiconductor circuit array responsive to the unique shorting signal for encoding it into the binary language of the calculator.

Referring to FIG. 24, the shift register SR 3 acts as the operand register of the arithmetic section of the calculator, having the 4 binary bit inputs corresponding to I 40, I 42, I 44, and I 46 of FIG. 22, the 8 outputs terminals corresponding to the output terminals of FIG. 22 and the clock pulse input terminal CP 2 corresponding to the terminal CP 1 or CP 2 of FIG. 25.

Referring to FIG. 23, the shift registers SR 1 and SR 2 are interconnected to act as a 48 bit accumulator register of the arithmetic section of the calculator. Each shift register SR 1 and SR 2 comprises the clock pulse circuit of FIG. 25 and the input terminal of these two clock pulse circuits are connected together to provide the terminal CP 1 corresponding to the input terminal CP 1 or CP 2 of FIG. 25. The accumulator register SR 1, SR 2 comprises the 4 input terminals to shift register SR 1 corresponding to the 4 bits applied at terminals I 40, I 42, I 44 and I 46 of FIG. 22. Four of the eight input terminals of shift register SR 1 corresponding to four marked output terminals of FIG. 22 are connected to the four input terminals corresponding to I 40, I 42, I 44 and I 46 of FIG. 22 in shift register SR 2. The 8 output terminals of shift register SR 2 correspond to the 8 output terminals of FIG. 22. Accordingly, the shift registers SR 1 and SR 2 are interconnected in the manner illustrated in FIG. 23 by means of the printed conductors on the substrate 7′ of FIG. 14. The remaining four output terminals of shift register SR 1 are not used.

Referring to FIG. 23, the four bits applied to the input of the accumulator register SR 1, SR 2 are designated A 1, A 2, A 3, and A 4 and are connected to the correspondingly marked terminals A 1, A 2, A 3 and A 4 of FIG. 15 by means of the printed conductors on the substrate 7′. The eight output terminals of the accumulator register SR 1, SR 2 are designated Y 1, $\overline{Y}$ 1, Y 2, $\overline{Y}$ 2, Y 3, $\overline{Y}$ 3, Y 4 and $\overline{Y}$ 4 are connected to the similarly marked terminals of FIG. 15 by means of the printed conductors on the substrate 7′. The clock pulse terminal CP 1 of the accumulator register SR 1, SR 2 is connected to the similarly marked terminal CP 1 of FIG. 16 by means of a printed conductor on the substrate 7′.

Referring to FIG. 24, the operand register SR 3 comprises 4 input terminals designated 01, 02, 03, and 04, which are connected to the similarly marked terminals 01, 02, 03, and 04 of FIG. 15 by means of printed conductors on the substrate 7′. The 8 output terminals of the operand register SR 3, designated X 1, $\overline{X}$ 1, X 2, $\overline{X}$ 2, X 3, $\overline{X}$ 3, X 4 and $\overline{X}$ 4 are connected to the similarly marked terminals of FIG. 15 by means of printed conductors on the substrate 7′. The clock pulse input terminal CP 2 of the operand register SR 3 is connected to the similarly marked terminal CP 2 of FIG. 18 by means of a printed conductor on the substrate 7'. The interconnected circuit components of the auxiliary electronics module 15 are connected to the compounds of the primary electronics 7 by means of the connections 12.

Referring to the FIG. 9, the terminals marked OS 1, OS 2, OS 3, OS 4, OS 5, OS 6, OS 7, ADV and PGT are connected to the similarly marked terminals of FIG. 18. The terminal marked PG of FIG. 9 is connected to the similarly marked terminal of the thermal printer 4 as illustrated in FIG. 8. The +3 volt terminal of FIG. 9, is connected to the similarly marked terminal of the power source illustrated in FIG. 13.

Referring to FIG. 10, the +12 volt terminal is connected to the similarly marked terminal of the power supply illustrated in FIG. 13. The terminal marked SOL is connected to the magnetic coil 35 of the tape advance system 11. The terminal marked $\overline{ADV}$ is connected to the similarly marked terminal of FIG. 18.

Referring to FIG. 11, the capacitor C 6 has its terminal E 1, E 2, connected to the similarly marked terminals of FIG. 18.

Referring to FIG. 12, the series connected diodes D 11 and D 12 have their −1.5 volt terminal connected to the 4.5 volt power source illustrated in FIG. 13, wherein the diode D 11 and D 12 are also illustrated.

Referring to FIG. 5, the terminals of the keyboard 6 marked .. KOP, COM, C, E, P, K 4, K 3, K 1, KBN, K 2, K 1, X, −, +, COM, KOP, ÷, are electrically connected to the components of the primary electronics 7 by means of the electrical connections 3. Whereas, the KBN terminal is connected to the similarly marked terminal of FIG. 18, the . terminal is connected to the DPT terminal of FIG. 18, the two KOP terminals are connected to KOP of FIG. 18, the COM terminals are connected to the ground connection of the primary electronics, the C terminal is connected to the terminal marked KBC of FIG. 18, the E terminal is connected to KBE terminal of FIG. 17, the P terminal is connected to the KBP terminal of FIG. 17, and X terminal is connected to the KBM terminal of FIG. 17, the − terminal is connected to the KBS terminal of FIG. 17, the + terminal is connected to the KBA terminal of FIG. 17, and the ÷ terminal is connected to the KBD terminal of FIG. 17.

The 15 input terminals of the thermal printer 4 corresponding to the input terminals input 30, 29 of FIG. 8 are connected respectively to the terminals marked A, F, K, L, G, B, H, N, M, I, D, E, O, J, and C of FIG. 17. The PG terminal of the thermal printer 4 corresponding to the similarly marked terminal of FIG. 8 is connected to the similarly marked terminal of FIG. 9. The +3 volt terminal of the thermal printer 4 corresponding to the similarly marked thermal of FIG. 8 is connected to the similarly marked terminal of the power supply illustrated in FIG. 13.

Accordingly, the primarily electronics comprising the arithmetic and control sections of the calculator is embodied in substantially one plane located beneath the encoder keyboard 6 to effect the high degree of electronic calculating capability while being mechanically adapted in relationship to the other parts of the calculator to result in extreme miniaturization and yet retain mechanical and operational simplicity.

Operation

The calculator, according to the described embodiment, is a binary coded decimal calculator, using the excess three binary decimal code and capable of adding, subtracting, multiplying and dividing with some degree of automatic decimal point placement. Operation is accomplished by means of the 18 keys, (23), and six digits may be entered into the calculator for any one number. The ten numeric keys, 0–9 are used to enter the number into the operand register SR 3. Each numeric key depression results in the corresponding digit being printed on the tape 14, which, consequently, is a record of all entry data, as well as the answers. The operand register, SR 3, comprises 24 bits, representing six digits.

The eight command keys are used to enter various commands into the calculator. The clear key, C, clears all registers in the arithmetic section of the primary electronics 7 and normalizes the circuits. A "C" followed by a space is printed on the tape 14 to record this operation. The add key, +, causes the number in the operand register, SR 3, to be added to that of the accumulator, SR 1, SR 2, and the result is stored in the accumulator register. A plus character folowed by a space is printed on the tape 14 to record this operation. The subtract key, −, causes the number in the operand register, SR 3, to be subtracted from that of the accumulator register, SR 1, SR 2 and the result is stored in the accumulator register. A minus character followed by a space is printed on the tape 14 to record this operation. The print key, P, is used to command the printout of whatever number is in the accumulator register, SR 1, SR 2. No special character is printed on the tape 14 to identify the print operation. However, the answer up to 12 numeric digits, plus decimal point, is printed on the tape, followed by two spaces to separate this record from later ones. The print operation does not clear the machine, so that further operations may be made on the number in the accumulator register. The multiply key ×, causes multiplication of the number in the operand register with that in the accumulator register. An X followed by a space and followed by the product which may comprise 12 digits plus decimal point, are printed on the tape 14. The multiplying operation automatically clears the machine, so that further calculations may be made without the use of the C key. The divide key ÷ causes division of the number in the accumulator register by that in the operand register. As in the case of multiplication, printout is automatic and results in the following format: /, space, six digit quotient, space, six digit remainder, two more spaces. The divide operation clears the machine, and no decimal points are printed in a divide operation. To prevent overflow, some degree of alignment of the two numeric entries to be divided is required. A suitable rule to follow is that the two numeric entries to be divided have an exactly equal number of significant digits up to six. Should overflow occur, due to the operator's not following a suitable alignment rule, no numeric answer will be produced, but the machine will be cleared and a C will be printed on the tape. The error key, E, is used to clear the contents of the operand register, SR 3, when an incorrect number has been entered. An E and a space will be printed after the faulty entry. This operation does not disturb the accumulator register. The decimal point key is used to insert decimal points in the entry numbers. There are seven valid locations for the decimal point on entry: before any of the digit entries; after all of the digit entries; or at any of the five places between the six permissible digit entries. In multiplication, the two numbers to be multiplied may have different positions of the decimal point. In addition and subtraction, the numbers to be added or subtracted should comprise the same number of digits following the decimal point. In any operation, if no decimal points are placed in the entry data, the numbers are treated as whole numbers, and the answer will contain no decimal point. In divide operations, a decimal point will not appear in the answer. However, if desired for record purposes, the entry data may contain decimal points, but these will be ignored by the calculator.

The use of the calculator for add, subtract, multiply, and divide, correlated with the suitable key depressions, is summarized as follows:

Addition

C, Clear (if necessary)

12.57 (Enters first operand into the operand register, SR 3)

+(adds first operand to zero, already in the accumulator register, SR 1, SR 2.)

3874,06 (Enters second operand into the operand register, SR 3).

+(Adds first and second operands and stores answer in the accumulator register).

P (Prints answer on tape 14).

Subtraction

C, Clear.

89307.1 (Enters first operand into the operand register).

+(Adds first operand to zero, already in the accumulator register).

300.0 (Enters second operand into the operand register).

−(Subtracts second operand from the first operand and stores answer in the accumulator).

P (Prints answer on tape 14).

Multiplication

C, Clear.

387.684(Enters multiplier in the operand register).

+(Adds multiplier to zero, already in the accumulator register).

9.04152(Enters a multiplicand in the operand register).

×(Multiplies multiplier and multiplicand, prints answer on tape, and clears machine).

Division 3505.25(Enters dividend in the operand register).

+(Adds dividend to zero, already in the accumulator register).

387.684(Enters divisor into the operand register).

÷(Divides dividend by divisor, prints answer on tape, and clears machine).

Figure 36:
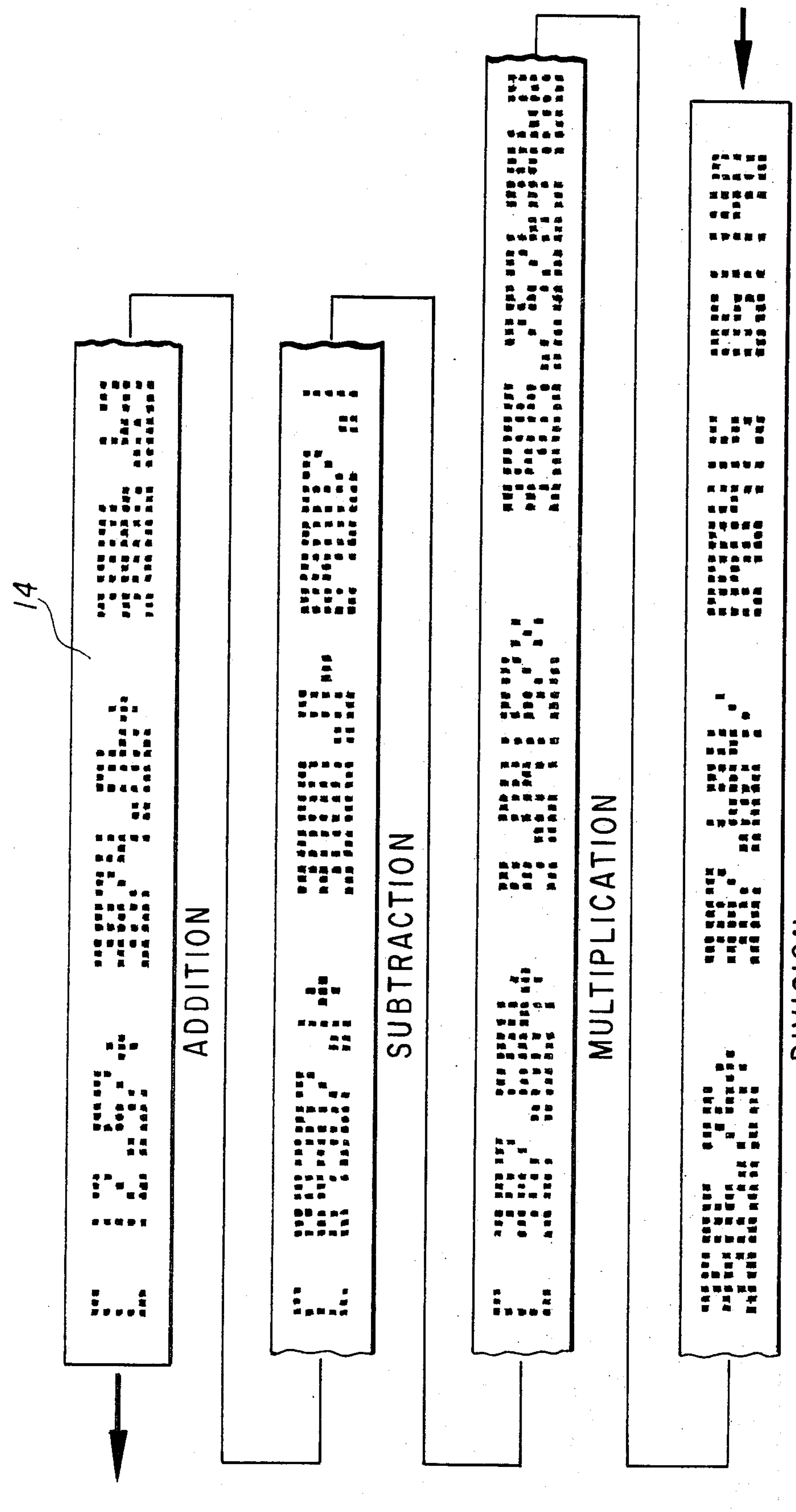
FIG. 36 illustrates the printout tape format.

FIG. 36 illustrates the resulting printout tape 14 format for the given key depressions of the above examples of addition, subtraction, multiplication and division.

Figure 26:
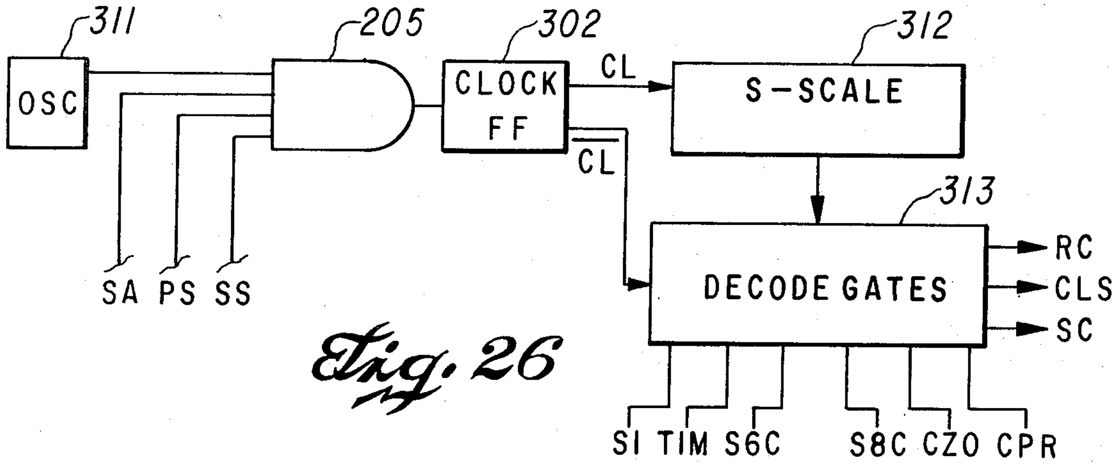
FIG. 26 illustrates a block diagram of a control section of the integrated semiconductor circuit array of FIG. 14.
Figure 27:
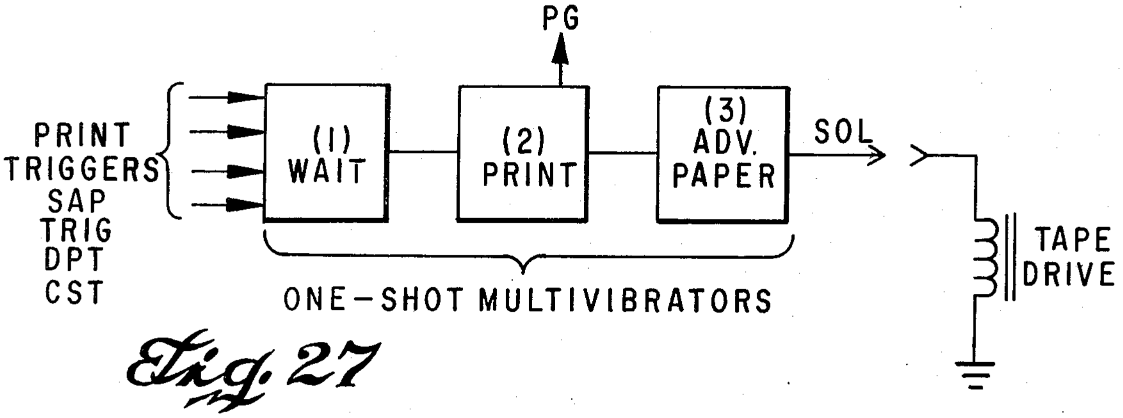
FIG. 27 illustrates a block diagram of the print control section of the integrated semiconductor circuit array of FIG. 14.
Figure 28:
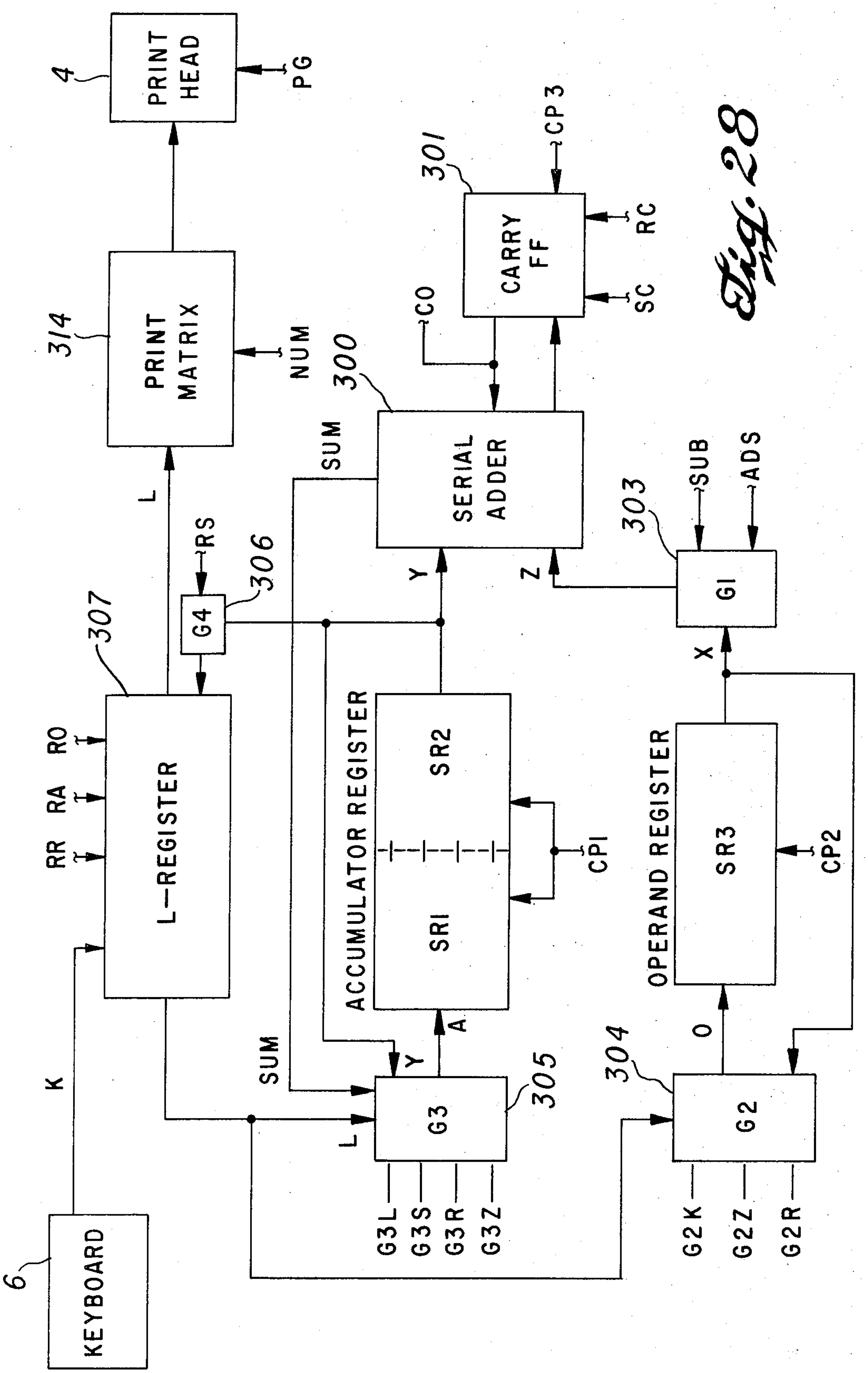
FIG. 28 illustrates a block diagram of the arithmetic section of the integrated semiconductor circuit array of FIG. 14.

B lock diagrams of the principal components of the control and arithmetic sections of the calculator are illustrated in FIGS. 26–28.

All operations of the calculator, with the exception of the decimal point insertion in response to the decimal point key being depressed, employ the central control system of FIG. 26, which provides the timing clock and timing signals for the operations of the calculator. Referring to FIG. 26, the oscillator 311 comprising the gates identified within the block 311 of FIG. 18 in conjunction with the capacitor C 6 of FIG. 11 is activated whenever the calculator is turned on by switch 5. The oscillator 311 generates a 50 kilocycle per second output signal, which is applied to the gate 205, along with the command signals SA, PS, and SS. When the command signals PS, SA, and SS are all high, or in the one state, the oscillator 311 output is transmitted to the clock flip flop 302, comprising the group of gates within the block 302 of FIG. 18. The clock flip flop 302 generates square wave pulses CL and their compliment $\overline{CL}$ which define the timing signals used extensively throughout the calculator. The command signals, SA, PS, and SS are generated by the internal circuitry of the calculator.

The S scale 312 comprising the group of gates within the block 312 of FIG. 18 is a 16-position counter and counts the clock pulses CL. The S scale is capable only of counting sequentially from one to 16, and the operations of the calcultor are timed by the 16 counts of the S scale. The four bit codes defining the 16 states, S 1 through S 16, of the S scale 312 are designated T 1, $\bar{T}$ 1, T 2, $\bar{T}$ 2, T 3, $\bar{T}$ 3, T 4, and $\bar{T}$ 4, illustrated in FIG. 18, in the manner that the position S 16, for example, of the S scale is $\bar{T}$ 4, $\bar{T}$ 3, $\bar{T}$ 2, $\bar{T}$ 1. T 1 is the least significant bit. Position S 16 is the normal position of the S scale. The 8 signals T 1, . . . T 4 are connected to the decode gates 313 comprising the group of gates within block 313 of FIG. 18 which use the clock pulse complement CL from the clock flip flop 302, and the counting sequence of the S scale 312 to generate the timing signals to control the various nonreiterative operations (digit entry, add, subtract, clear, error) of the calculator.

For example, when the add key is depressed, the SS command is disturbed and caused to go high, allowing a single rotation of the S scale. Return of the S scale to its normal position S 16 regenerates the SS command, which blocks the gate 205 and stops the clock flip flop 302. Operations that require a single rotation of the S-scale are add, subtract, clear, error, and digit entry. The depression of any key except the decimal point key causes the clock flip flop to run.

Multiply, divide, and printout are reinterative processes. The calculator multiples two numbers by adding the number in the operand register (multiplicand) to the accumulated number in the accumulator register the number of times specified by the number in the accumulator register (multiplier). The calculator divides by subtracting the number in the operand register (divisor), from the number in the accumulator register (dividend), until a negative result is obtained, adding the divisor to the remainder in the accumulator register, shifting, and then repeating six times. Printout of a number from the accumulator register requires repeated energization of the printer in order to serially printout each digit of the number in the accumulator register.

The multiply, divide, and print control is principally illustrated in FIG. 16 and comprises an M scale comprised of the group of gates within the block 309 of FIG. 16, which is only used during multiply, divide and printout. The M scale is a 16 position counter, having its 16 positions M 1 through M 16 defined by the four bit codes N 1, $\overline{N}$ 1, N 2, $\overline{N}$ 2, N 3, $\overline{N}$ 3, N 4 and $\overline{N}$ 4 which provide the timing for the major operations in multiply, divide and printout. The M scale differs from the S scale in that it is not a simple counter.

It is capable of stopping at some intermediate count and returning to an earlier count, so that certain control signals can be repeated, which is needed, since multiply and divide are repeated addition and repeated subtraction. The multiply, divide, and print control also includes an M-D counter, comprised of the group of gates within the block 308 of FIG. 18. The M-D counter is a 16 position counter used to keep a record of the number of suboperations performed, while the M scale controls the reiterations of the operations. The multiply, divide, and print control produces output signals which initiate new add, subtract, and print operations. The multiply and divide operations are initiated by the multiply flip flop 316 and the divide flip flop 315 of FIG. 17 in response to the commands KBM and KBD.

Any time an action is taken that requires a character or space to be printed, a sequence of three one-shot multivibrators fires successively. Referring to FIG. 27, a print trigger may come from the multiply, divide, and print control or a key, which will trigger the first one-shot multivibrator. The first one-shot multivibrator defines a waiting period of about 40 milliseconds. Then the second one-shot multivibrator is fired, and generates the print command, PG, which is applied to the thermal printer 4. The second one-shot multivibrator defines a time delay interval of about 10 milliseconds, sufficient to allow the selected portions of the thermal printer to be made hot to print. Then the third one-shot multivibrator is fired, which defines a time delay interval of about 30 milliseconds, generating the command SOL, applied to the magnetic coil 35 for advancing the tape 14.

The three one-shot multivibrators for the printing sequence comprise the group of gates within the block 310 of FIG. 18 in conjunction with the interconnected circuit components of FIG. 9 which supplies the R-C components that define the time delays. The output of the third one-shot multivibrator, $\overline{ADV}$ of FIG. 18, is applied to the similarly marked terminal $\overline{ADV}$ of FIG. 10, in order to generate the appropriate command SOL at the output of the circuit of FIG. 10.

FIG. 28 illustrates a block diagram of the arithmetic section of the primary electronics of FIG. 14. The actual arithmetic operations essentially take place in the 48 bit accumulator register SR 1, SR 2, the 24 bit operand register SR 3, and the serial adder 300 comprised of the group of gates within the block 300 of FIG. 15. The accumulator and operand registers provide the memory of the entered numbers. The accumulator register SR 1, SR 2 stores the result of each operation for use in the next operation. The operand register, SR 3, stores the second entered number which is to be added or subtracted from the number in the accumulator register. The serial adder 300 links the operand register and the accumulator register, and it is in the serial adder that the addition of true or complement binary numbers is performed. A carry flip flop 301, comprised of the group of gates within the block 301 of FIG. 15 is connected to the serial adder 300 for storing the carry when the addition of two digits results in a number greater than ten, so that this carry may be added when the next two digits of higher significance are added in the serial adder. Subtraction of the number in the operand register from that in the accumulator register is achieved by adding the nine's complement of the number in the operand register to that in the accumulator register. The carry flip flip 301 is used in this operation to supply the additional binary one required in the nine's compliment subtraction.

The L register 307, comprised of the group of gates within the block 307 of FIG. 15, buffers the input and output information coming from and going to the accumulator and operand registers. The L register acts as a four bit register and also serves as a 16 position counter to supervise the number of additions and subtractions occuring in multiply and divide operations.

The manner in which the L register is utilized for input, output, multiply, or divide is controlled by the commands RO, RA, RS, and RR.

The suitably binary encoded digits K from the keyboard encoder 6 are applied to the L register and stored there.

Digits L to be printed are serially applied to the print matrix 314 comprised of the group of gates within the block 314 of FIG. 17, from the L register 307, and then applied to the thermal printer 4.

Several gates, G 1 through G 4, control the transfer of information within the arithmetic section. These gates are in turn controlled by timing and command signals, shown at their inputs. The gate G 1 comprises the group of gates within the block 303 of FIG. 15. The gate G 2 comprises the group of gates within the block 304 of FIG. 15. The gate G 3 comprises the group of gates within the block 305 of FIG. 15, and the gate G 4 comprises the group of gates within the block 306 of FIG. 16.

Figure 34:
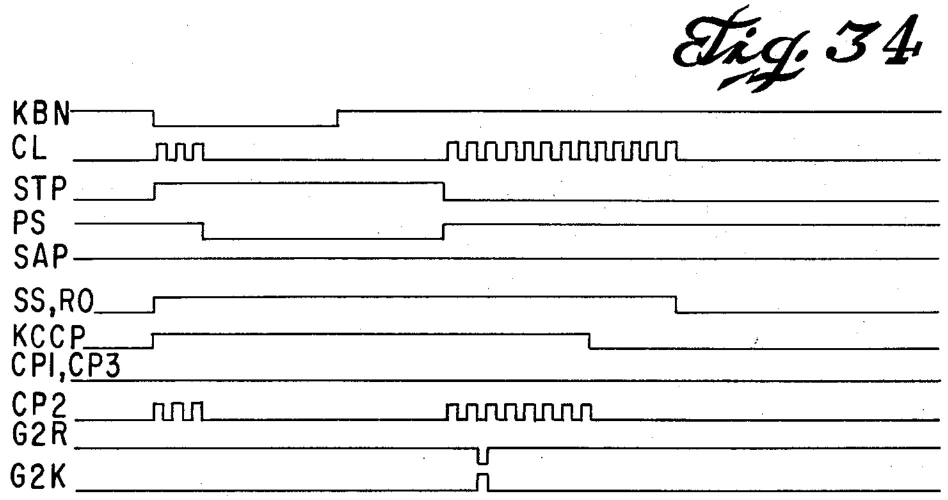
FIGS. 34 and 35 illustrate the timing diagrams of the commands for digit entry, add and subtract operations of the calculator of FIG. 2.

A digit 0–9 entry into the calculator will now be described with reference to FIG. 28 and FIG. 34 which illustrates the timing sequence of the signals. When a numeric key is depressed the digit is encoded into four bits, K 4, K 3, K 2, K 1, and stored in the L register 307. The four stored bits in the register 307 are first transmitted to the print matrix 314, which decodes the binary information and converts it into the appropriate shape for the heater element array of the thermal printer 4 in the manner that the proper numeric symbol will be printed on the tape 14. The NUM command is high and applied to the print matrix at the time of firing of the second one shot multivibrator to inform the print matrix that a digit is being printed. After the digit is printed on the tape 14, the four bits from the L register 307 are applied through gate G 2 to the operand register SR 3, and appear in the right hand column of the operand register at the termination of the digit entry cycle. The four bits stored in the L register 307 are defined by the signals L 4, $\overline{L}$ 4, L 3, $\overline{L}$ 3, L 2, $\overline{L}$ 2, L 1, $\overline{L}$ 1, L 1 being the least significant bit. It is the L signals at the output of the L register which are transmitted to the print matrix 314, and to the gate G 2 for insertion into the operand register, SR 3. The gate G 2 decodes the L signals and applies the O signals to the operand register.

Whenever a numeric key is depressed, the command KBN is grounded. The low state of the KBN command disturbs the KCCP flip flop 320 (FIG. 18) which causes the command KCCP to go high and inform the calculator that a digit entry is being made. The low state of the KBN command also causes the command SS to become high and unblock the gate 205 to allow the clock flip flop 302 to start running and generate the clock pulses CL. This can be seen with reference to FIG. 18, Where the terminal KBN would be grounded, causing the output of gate 654 to be high, the output of gate 652 to be low, the output of gate 653 to be high, and consequently cause the command SS to be high. The grounded state of the KBN command also causes the TRIG command to be high, which triggers the first one-shot multivibrator, initiating the printing sequence. This can be seen with reference to FIG 16, where the KBN terminal would be grounded, causing the output of gate 265 to be high, and consequently the TRIG command to be high, and with reference to FIG. 18, where the TRIG terminal would be high, causing the output of gate 637 to be low and consequently trigger the first one-shot multivibrator input gate 636. Whenever the first one-shot multivibrator is triggered, the output of gate 635 is low and the output of gate 640 is high, and consequently the STP command is high. When the S scale is at position S 3, that is, it counts three clock pulses CL, which is represented by the code $\overline{T}$ 4, $\overline{T}$ 3, T 2, T 1, all being high, and the STP command is high, the gate 674 is low and consequently the command PS is low, thereby blocking the gate 205 and stopping clock flip flop 302. The time period in which the command PS is low, stops the clock 302 and allows the printing sequence effected by the sequential firing of the three one-shot multivibrators to take place and print the digit on the tape 14. The firing of the second one-shot multivibrator generates the command PG, which is applied to the printer 4 and allows the printing, and the firing of the third one-shot multivibrator generates the command SOL, which is applied to the magnetic coil 35 and causes the tape 14 to advance one space. After the expiration of the third one-shot multivibrator interval, the output of gate 630 is high, causing the output of gate 640 to be low and consequently the STP command to be low, which in turn causes the output of gate 674 to be high and consequently the PS command to be high, thereby unblocking the gate 205 and allowing the clock 302 to run and the S scale to count the remaining 14 clock pulses, CL. At position S 16 of the S scale, the SS command is regenerated and becomes low, thereby stopping the clock 302 in the normalized position and completing the digit entry cycle.

The time during which the KCCP command is high defines the time during which the binary information in the operand register is recirculated and binary information is transferred into the operand register. The clock pulses $\overline{CL}$ generate the 11 clock pulses CP 2, applied to the operand register during the interval of the high state of the command KCCP. During the time period of the first five clock pulses cp 2, the G2R command is high, unblocking the gate G 2 and allowing the binary information already in the operand register to recirculate out of the right hand column of the register into the left-hand column of the register. After the fifth clock pulse CP 2, that is, at time 5 CL, the G2R command goes low, blocking recirculation, and the G2K command goes high, allowing the four bits 01, 02, 03, 04 representing the 4 bits in the L register to be transferred into the left hand column of the operand register, SR 3. This transfer is effected at the time of the sixth clock pulse, CP 2. The succeeding five clock pulses, CP 2 shift the four bits now in the left hand column of the operand register to the right hand column of the operand register, while the command G2R is high and allows recirculation of the other binary information in the operand register. The entered digit now appears in the right-hand column of the operand register.

After a number is entered into the operand register, the add or plus key is depressed to add the number in the operand register to the one in the accumulator register and store the result in the accumulator register. A plus symbol, followed by a space, is printed on the tape 14. With reference to the timing diagram of FIG. 35, when the plus key is depressed, the command KBA is grounded, causing the PRC command to go high (the output of gate 482, FIG. 17 goes high) and the output of gate 686, FIG. 18, is low. Consequently the RC command is caused to go low at the time of the first clock pulse $\overline{CL}$. Since the command KOP is grounded by the depression of the add key, the output of gate 639 is high which, in conjunction with the command PRC being high, causes the output of gate 638 to be low and generate the low command, CST, which triggers the input gate 636 of the first one-shot multivibrator. The RC command being low at the first clock pulse $\overline{CL}$ triggers the add flip flop 317 of FIG. 17 so that the output of gate 407 is high which in conjunction with the command PRC being high causes the output of gate 409 to be low. Consequently the command KAB at the output of gate 409 is low and results in a plus character code in the print matrix 314, which is printed on tape 14 upon the occurrence of the command PG from the firing of the second one-shot multivibrator.

Moreover, the depression of the add key causes the command STP to go high and, in conjunction with the position S 3 or the third clock pulse, causes the command PS to go low and stop the clock flip flop 302. The time duration in which the command PS is low defines the time in which the printing takes place and the time duration in which the clock flip flop is stopped. After the third one-shot multivibrator fires, the command STP goes low and allows the command PS to go high and start the clock, as was previously explained. When the add key is depressed, the KBA command goes low, the flip flop 317 is disturbed and causes the ADD command to go high, and since all the inputs to gate 403 are high, the output of gate 403 is low, causing the command AS to go high. The time duration of the commands ADD, AS define the add cycle. Shortly, after the 11 clock pulse $\overline{CL}$, the command SAP goes low, thereby triggering the first one-shot multivibrator to generate the command SOL and advance the tape 14 one space, which sequence defines the space after the plus symbol on the tape. At some time after the 16 pulses $\overline{CL}$, the third one-shot multivibrator fires and causes the command STP to go low. Twelve clock pulses CP 1, CP 2, CP 3, are generated during the add cycle which define the twelve shifts for the operand and accumulator registers. At the conclusion of the twelfth clock pulse, CP 1 CP 2, CP 3, the command CLS goes low, causing the commands ADD, AS to go low and terminate the add cycle.

The four-bit code X 1, $\overline{X}$ 1, X 2, $\overline{X}$ 2, X 3, $\overline{X}$ 3, X 4, $\overline{X}$ 4, at the output of the operand register SR 3 is applied to the gate G 1, 303, decoded and the output of the gate G 1, 303, in the form of the commands Z 1, Z 2, Z 3, and Z 4, are applied to the input of the serial adder 300. During the first six clock pulses CP 1, P 2, CP 3, the six digits represented by the Z commands from the gate 303 are serially added to the six digits represented by the Y commands in the right hand side of the accumulator register, and since the command G 3S is high, the sum is sequentially entered through the gate G 3 and stored in the left hand side of the accumulator register. The commands A 1, A 2, A 3, and A 4 define the code at the output of gate G 3, which is applied to the input of the accumulator register. During the last six clock pulses CP 1, CP 2, CP 3, the command ADS is high, which cuases numeric zeros to be added to the six numeric digits in the right hand side of the accumulator register and sequentially circulated through the gate G 3, back into the accumulator register. Accordingly, the 12 decimal digits in the accumulator register are sequentially added to the six decimal digits in the operand register and the six numeric zeros, while the 12 digit result is stored in the accumulator register.

At the outset of the add cycle, the RC command goes low and, in addition to its aforementioned functions, it clears the carry flip flop 301 and sets it to zero.

Figure 35:
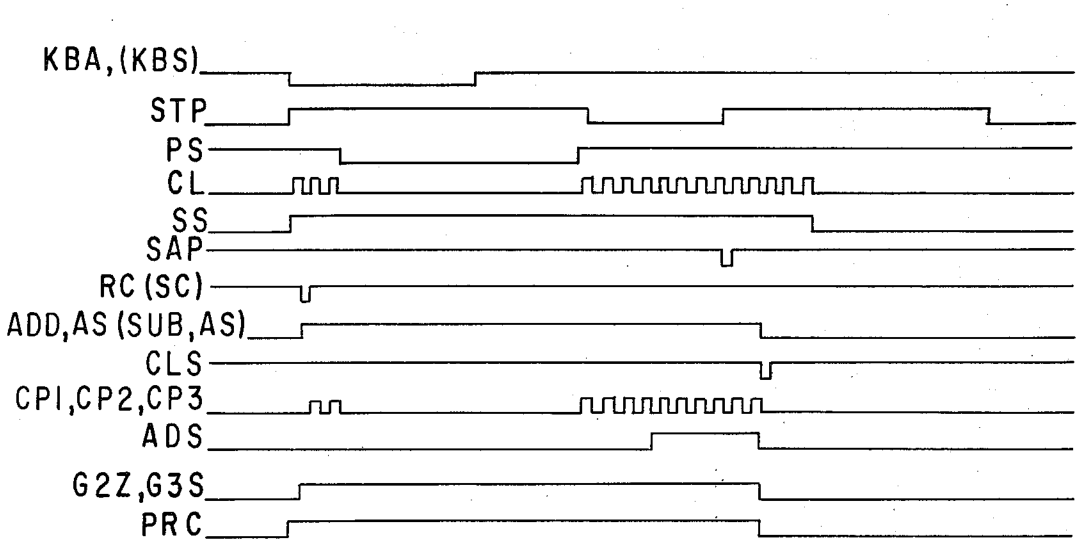

FIG. 35 also illustrates the timing diagram of the commands in a subtract cycle, the commands within the brackets replacing those to the left. When the minus key is depressed, the command KBS is grounded, which causes the PRC command at the output of gate 482 (FIG. 17) to go high. The SC command at the output of gate 684 (FIG. 18) goes low after the first clock pulse $\overline{CL}$ and disturbs the flip flop 318, causing the output of gate 405 to go high. Consequently, the KSB command at the output of gate 405 goes low and applies the appropriate code to the print matrix 314, so that a minus character may be printed on the tape. The STP command being high in conjunction with the third clock pulse CL, causes command PS to go low and stop the clock flip flop 302 and define the printing period, wherein the first one-shot multivibrator is triggered by the CST command. After the third one shot multivibrator fires, the STP commands goes low and causes the PS command to go high and allow the clock flip flop 302 to begin running again. The SC command going low causes the commands SUB, AS to go high and define the subtract period. During the time period of the commands SUB AS 12 clock pulses CP 1, CP 2, CP 3, are generated. The command CLS generated after the twelfth clock pulse CP 1, CP 2, CP 3, causes the commands SUB, AS to go low and terminate the subtract cycle. After the eleventh clock pulse $\overline{CL}$, the command SAP goes low, and the command STP goes high. Consequently, the command SAP triggers the first one-shot multivibrator and initiates the generation of the command SOL to advance the tape one space, the third one-shot multivibrator firing some time after the 16th clock pulse $\overline{CL}$ causing the command STP to go low. During the time period in which the command SUB is high and the command ADS is low, the commands Z 1, Z 2, Z 3, Z 4 are respectively equal to the commands $\overline{X}$ 1, $\overline{X}$ 2, $\overline{X}$ 3, $\overline{X}$ 4, which present the nine's complement of the number in the operand register to the serial adder 300. During the time period in which the command SUB is high and the command ADS is high (the last six clock pulses CP 1, CP 2, CP 3) the Z inputs to the serial adder are excess three binary coded nines by reason of the command ADS being high.

It should be noted that during the subtract cycle, the command SC is initially generated low and sets the carry flip flop 301 to the one state for the nine's complement addition during the subtract cycle. Whereas, during the add cycle, the command RC sets the carry flip flop initially to zero.

Moreover, the STP command remains high until the termination of the firing of the third one-shot multivibrator in the printing sequence and when the STP command goes low, the clock flip flop 302 is allowed to run again. However, as long as a key is depressed, the firing of the first one-shot multivibrator is maintained, so that the clock flip flop cannot begin running again. This locking feature insures that the key will be released and that a complete encoding is effected before the operation of the calculator continues.

For multiplying two numbers, the first number is entered into the operand register SR 3 as previously discussed with respect to a digit entry, the add key is depressed for adding the number in the operand register to the zero number in the accumulator register by way of the serial adder and storing the result, which is the number entered into the operand register, in the accumulator register. The second number is entered into the operand register as previously discussed with respect to the digit entry. The 6 digits of the first number now occupy the 6 columns in the accumulator register SR 2, the six columns of accumulator register SR 1 are zero and the six digits of the second number occupy the six columns of the operand register SR 3. For the purpose of this explanation the 12 columns of the accumulator register SR 1, SR 2 are numbered 1–12, those of the operand register SR 3 are numbered 1–6, the left hand column being 1 and the right hand column 6 or 12. Consequently, the most significant digit of the first number in the accumulator register occupies column 7 and the least significant digit column 12 while the most significant digit of the second number in the operand register occupies column 1 and the least significant digit of the second number occupies column 6. The X key is depressed. The five least significant digits of the first number in columns 8–12 of the accumulator register are recirculated through the gate G 3 (the command G3R being high) and are placed in columns 1–5 of the accumulator register. The most significant digit of the first number from column 7 of SR 1, SR 2, is transmitted through gate G 4 into the L register and stored there (the command GR 3 being low during the 6th clock pulse CP 1). This shifting operation is controlled by the multiply, divide, print control and is accomplished during several rotations of the S scale. At this time, before any arithmetic calculation is performed, the accumulator register contains the five least significant digits of the first number in columns 1–5, the remaining columns being zero. The L register contains the most significant digit of the first number. The operand register contains the second number. The M scale 309 now initiates an add cycle. The second number in the operand register is added to the number in the accumulator register, the zeros in column 7–12, through the serial adder 300 and stored in the accumulator register through the gate G 3 (the command G3S being high). After one rotation of the S scale, the 5 least significant digits of the second number occupy columns 1–5 of SR 1, SR 2. The second number now in the accumulator register columns 7–12 is now added to the number in the operand register the number of times specified by the number stored in the L register which is the most significant digit of the first number to be multiplied. The number in the L register is decreased by one after each addition in order to initiate an add cycle until the number in the L register becomes zero. Consequently, the decreasing number in the L register serves as a tally of the number of additions made. When the number in the L register is decreased by one, the add cycle is initiated and the S scale rotates through its 16 positions to accomplish the addition and store the result in the accumulator register. The M scale 309 is then advanced one position and reinitiates an add cycle if the number stored in the L register is not zero. In this manner, the number in the operand register (the second number to be multiplied) is added to the accumulator register the number of times specified by the most significant digit of the first number to be multiplied and the sum is stored in the columns 7–12 of SR 1, SR 2. While column 6 of SR 1, SR 2 stores any carry resulting from the addition which might be directed by the carry flip flop 301. The sum located in SR 1, SR 2 columns 7–12 or with column 6 if there was a carry is now shifted left one place and added to the second number in the operand register the number of times specified by the next most significant digit of the first number that is, the digit appearing in column 1 of SR 1, SR 2 before the shift. This shift is accomplished in the manner that 11 clock pulses CP 1 cause the 11 digits in columns 2–12 of the accumulator register to recirculate through the gate G 3 and the 12th clock pulse CP 1 causes the second most significant digit (formerly column 1) of the first number to be stored in the L register through G 4, this same 12th clock pulse CP 1 causing insertion of a numeric zero (G3Z is high) in column 1 of SR 1. Eleven more clock pulses CP 1 (total of 23) and G3R high, complete the shift. The multiply cycle continues as above for each of the remaining four least significant digits of the first number until the second number to be multiplied in the operand register is added to the accumulated number in the accumulator register the number of times specified by the first number to be multiplied and the answer is stored in the accumulator register. The MD counter 308 counts the six digits shited into the L register from the gate G 4 and generates a command D 6 terminating the multiply cycle a predetermined time after the least significant digit of the first number to be multiplied stored in the L register, is reduced to zero by the tally operation previously described. An "×, " a space, the product up to 12 digits and a decimal point if entered are printed on the tape. The tape is advanced two additional spaces and the machine is cleared.

For division, the dividend is placed in the accumulator register columns 7–12 and the divisor is placed in the operand register. When the divide key is depressed, the L register is automatically set to contain the digit 11. The multiply, divide, print control then initiates a subtract cycle. The divisor is then subtracted from the dividend and the result is stored in the accumulator register and circulated so that the 6 digit result occupies columns 7–12. The number 11 stored in the L register is then reduced by 1 to 10. This operation is achieved during one rotation of the S scale. The divisor is subtracted from the resulting number in the accumulator register and the number stored in the L register is reduced by 1 until the result in the accumulator register becomes negative. When the resulting number in the accumulator register is less than the divisor, the subtraction results in a negative number, the nine's complement of which is stored in the accumulator register, nines therefore resulting are in the accumulator register columns 1–5, and possibly 6. This condition initiates an add cycle so that the divisor is added to the result in the accumulator register to restore the previous result stored in the accumulator register. During this addition the L register is also reduced by 1. The number of subtractions and the addition which has now been performed is the number the divisor goes into the dividend plus 2. That is, the dividend was divisable by the divisor N times and $N + 2$ operations have been performed. Consequently, the number stored in the L register has been reduced from 11 to 11- $(N + 2)$. Since the excess 3 binary code is being used the number now in the L register represents the nine's complement of N. The number stored in the L register is now complemented and shifted into column 6 of SR 1, SR 2 through gate 3 utilizing command G3L. The accumulator register at this point contains zeros in columns 1–5, the number N in column 6 and the remainder resulting from N subtractions of the number in the operand register from the number in the accumulator register. 11 clock pulses CP 2 are now generated to shift the digits in the accumulator register to the right and recirculate them through the gate G 3 so that the previous digits in the accumulator register are effectively shifted to the left one column. The L register is reset to 11 and the MD counter is advanced one. The accumulator register now contains zeros in columns 1–4, the digit N in column 5, and the remainder from the previous subtractions shifted one column to the left columns 6–11, with 12 containing a zero. The subtraction process is repeated with the number stored in the L register being reduced by one each time and then the final number stored in the L register complemented and transferred into the column 6 of SR 1, SR 2 as before. Accordingly, the digits in the accumulator register are again shifted effectively to the left one column and the subtraction process repeated with the MD counter advanced one count each time. This repeated subtraction, adding to restore the previous number in the accumulator register when it becomes negative then effectively shifting the digits in the accumulator register one column to the left and entering the complemented final number in the L register into the accumulator register column 6 is repeated 6 times and counted by the MD counter. After the process is repeated 6 times, the MD counter generates a command D 6, to the M scale informing it that the division is complete and that the accumulator register now contains in columns 1–6 the six digits of the quotient and in column 7–12 the six digits of the remainder. The operand register contains the divisor originally entered into it. A slant, space, six digit quotient, a space, six digit remainder and two more spaces are printed on the tape and the calculator cleared.

The decimal point circuits comprise the group of gates within the block 319 of FIG. 17 and comprise two counters and appropriate control circuits that store the decimal point entry. The counts correspond to the number of digits entered to the right of the decimal point on each of the two number entries (operands). During printout of the results in the accumulator register. these two counters are counted up to a standard count by a series of pulses that correspond to the delivery of the digits to the thermal printer. The decimal point circuitry is arranged so that this count may achieve two different results. If the printing operation is due to merely additions and subtractions followed by a depression of the print key, the counters are so configured that the standard count and the decimal point insertion will occur at such a time that the remaining number of digits to be printed out to the right of the answer decimal point will exactly equal the number of digits to the right of the decimal point on the last operand. If, on the other hand, the printout operation is due to a multiply operation, the standard count will occur at such a time that the number of remaining digits to the right of the answer decimal point is equal to the sum of the right hand counts of the two previous operands.

The following sets forth the alphebetical listing of the variables of the described calculator, their function and the figure in which they are generated.

| | |
|---|---|
| A 1, A 2, A 3, A 4 | Inputs to Accumulator Register SR 1, SR 2. A 1 is least significant. FIG. 15. |
| $\overline{\text{AACP}}$ | Allows 6 clock pulses CP 1 to Accumulator Register during multiply operation. FIG. 16 output of gate 201. |
| AD | Starts Add cycle during divide. FIG. 16. |
| ADD | Used during Add or Subtract Operations to fill in dummy zeros or nines to be added to the Accumulator Register. FIG. 15. |
| ADV | Low during tape advance one shot multivibrator operations. FIG. 18. |
| $\overline{\text{ADV}}$ | Complement of ADV. |
| ADX | Starts Add Cycle during multiply operation. FIG. 16. |
| AS | High during Add or Subtract Cycle. FIG. 17. |
| $\overline{\text{AS}}$ | Complement of AS. |
| $\overline{\text{BBCP}}$ | Allows 23 Clock Pulses CP 1 to Accumulator Register during Multiply. FIG. 16. |
| BBCP | Complement of $\overline{\text{BBCP}}$. |
| CAC | During Printout, allows Accumulator Register to be shifted 11 positions. FIG. 16. |
| CDIV | Clocked Divide. Same as DIV, except at time (S 15) $\overline{\text{CL}}$, when unconditionally zero. For avoiding ripple-through transients on the M-scale. FIG. 16. |
| CL | Main Clock Line. FIG. 18. |
| $\overline{\text{CL}}$ | Complement of CL. |
| CLS | Drops to zero during (S 13) $\overline{\text{CL}}$ time. Terminates Add and Subtract operations. FIG. 18. |
| CMPY | Clocked Multiply. Similar in function to CDIV. FIG. 16. |
| CO | Carry Output of the carry flip flop. Checked at time (S 8) $\overline{\text{CL}}$ during Subtract Cycle of a Divide Operation, to determine when to terminate Subtractions and restore Accumulator Register by an Add Cycle. FIG. 15. |
| CP 1 | Clock Pulses to the Accumulator Register. FIG. 16. |
| CP 2 | Clock Pulses to the Operand Register. FIG. 18. |
| CP 3 | Clock Pulses to the Carry Flip-Flop. FIG. 16. |
| CPR | Positive at (S 12) $\overline{\text{CL}}$ time. Used by Printout Sequence. FIG. 18. |
| $\overline{\text{CPR}}$ | The complement of CPR. |
| CST | Low whenever ADD, SUB, MPY, DIV, CLEAR or ERROR keys are depressed. FIG. 18. |
| CZO | Positive at (S 11) $\overline{\text{CL}}$ time. FIG. 18. |
| $\overline{\text{CZO}}$ | The complement of CZO. |
| D 6 | Low when a 6 count exists in the M-D counter. FIG. 18. |
| $\overline{\text{D6}}$ | Complement of D 6. |
| $\overline{\text{D 12}}$ | High when a 12 count exists in the M-D counter. FIG. 18. |
| D 12 | Complement of $\overline{\text{D 12}}$. |

| | |
|---|---|
| $\overline{\text{DACP}}$ | Controls 12 Accumulator Register Shift Pulses CP 1 during Divide. FIG. 16. Output of gate 293. |
| $\overline{\text{DBCP}}$ | Controls 11 Accumulator Register Shift Pulses CP 1 during Divide. FIG. 16. Output of gate 283. |
| DEC | High when both decimal point counters have a six count during print. Indicates when to print a decimal point on Multiply and Print Operations. FIG. 17. |
| DIV | High during a Divide Operation. FIG. 17. |
| $\overline{\text{DIV}}$ | Complement of DIV. |
| DMO | Held low during Multiply, Divide and Print Operations if the M-Scale is at other than zero position. Causes Clock 302 to run continuously. FIG. 18. |
| DPT | Low when decimal point key is depressed. FIG. 18. |
| DTP | Decimal point to print matrix. FIG. 18. |
| DZ | Low when the L-Register contains a zero in excess—three binary code. During Multiply, it stops chain of additions and shifts of Accumulator. Also used for zero-suppress information during printout. FIG. 17. |
| ERC | High during Error Clear Operation. FIG. 17. |
| G1A, G1B, G1C, G1D | Set of variables generated by ADS and SUB. FIG. 15. |
| G2E | Low during Error Clear. Presents excess-three zero to the Operand Register input and gates clock 302 pulses to CP 2. FIG. 17. |
| G2K | When high, presents the L-Register contents to the input of the Operand Register. FIG. 15. |
| G2R | When high, connects the output of the Operand Register to its input. Used to cyclically rotate the Operand Register. FIG. 15. |
| G2Z | Holds excess-three binary zero on the input of the Operand Register. FIG. 15. |
| G3L | Presents nine's complement of the L-Register contents to the Accumulator Register input. FIG. 16. |
| G3R | For Rotating Accumulator Register. FIG. 16. |
| G3S | Presents sum output of the Serial Adder to the Accumulator Register input. FIG. 15. |
| G3Z | Holds excess-three binary zero on Accumulator Register input. FIG. 16. |
| GKC | Becomes low at (S 5) $\overline{\text{CL}}$ time during a numeric entry from keyboard operation. Defines instant when the keyboard number (contained in the L-Register) is to be presented to the Operand Register. FIG. 18. |
| K1, K2, K3, K4 | Digit entry output of keyboard encoder. Ground indicates a zero, open indicates a one, in the excess-three binary code. K1 is least significant. |
| KAB | When low, defines (+) character in Print Matrix. FIG. 17. |
| $\overline{\text{KAS}}$ | High during an Add or Subtract Operation, if these Operations are not sub-parts of a Multiply-Divide Operation. Used in Decimal Point Counting. FIG. 17. Output of gate 476. |
| KBA | Low when the (+) key is depressed. |
| KBC | Low when the (C) key is depressed. |
| KBD | Low when the (÷) key is depressed. |
| KBE | Low when the (E) key is depressed. |
| KBM | Low when the (X) key is depressed. |
| KBN | Low when any numeric key is depressed. |
| KBP | Low when the (P) key is depressed. |
| KBS | Low when the (−) key is depressed. |

| | |
|---|---|
| KCB | When Low, defines (C) character in print matrix. |
| KCCP | High during numeric entry. FIG. 18. |
| $\overline{KCCP}$ | Complement of KCCP. |
| KDB | When low, defines (/) Character in print matrix. FIG. 17. |
| KEB | When low, defines (E) Character in print matrix. FIG. 17. |
| KMB | When low, defines (X) Character in print matrix. FIG. 17. |
| KOP | Low when any key, other than a numeric key, is depressed. |
| KSB | When low, defines (−) character in print matrix. FIG. 17. |
| L 1, L 2, L 3, L 4 | Bit outputs of the excess-three binary coded contents in the L-Register. FIG. 15. |
| $\overline{L\ 1}$, $\overline{L\ 2}$, $\overline{L\ 3}$, $\overline{L\ 4}$ | Complement of L 1, L 2, L 3, L 4. |
| M 1 – M 16 | Shorthand notations for the four-bit codes defining the sixteen states of the M-scale. The individual bits are named N-numbers. For example, M 1 equals $\overline{N}$ 4, $\overline{N}$ 3, $\overline{N}$ 2, and N 1. This scale is used to define the major steps in Multiply, Divide, and Print. M 16 is considered to be the home, or zero position. FIG. 16. |
| MA | When pulsed, causes the M-Scale to count forward. FIG. 18. |
| MAMD | Low during (S 15) $\overline{CL}$ time, if MDP is high. Defines significant times for variables MA, CDIV, and CMPY. FIG. 18. |
| MD | High during a Multiply or Divide Operation. FIG. 17. |
| $\overline{MD}$ | Complement of MD. |
| MDC | When pulsed, causes the M-D Counter to advance. Used in Multiply, Divide, Print. FIG. 16. |
| MDC 2 | When low, generates MDC. Occurs during Divide. FIG. 16. output of gate 304. |
| MDC 3 | When low, generates MDC. Occurs during Print. FIG. 16. Output of gate 266. |
| MDP | High during Multiply, Divide, or Print. FIG. 17. |
| MPY | High during Multiply. FIG. 17. |
| N 1, N 2, N 3, N 4 | Outputs of the M-Scale. See M 1 – M 16. FIG. 16. |
| $\overline{N\ 1}$, $\overline{N\ 2}$, $\overline{N\ 3}$, $\overline{N\ 4}$ | Complements of N 1, N 2, N 3, and N 4. |
| NUM | Must be high to print a number contained in the L register. FIG. 16. |
| 01, 02, 03, 04 | Excess-three binary coded bit inputs to the Operand Register. FIG. 15. |
| PAS | When low, sets first decimal point counter to zero. FIG. 17. Output of gate 477. |
| PGT | Low during one-shot multivibrator operations defining thermal print time. FIG. 18. |
| $\overline{PGT}$ | Complement of PGT. |
| PRC | Must be high to print (+ − × C E) characters. Combined with KOP to form CST. FIG. 17. |
| PS | Clock 302 stop at (S 3) $\overline{CL}$ time, for print duration. FIG. 18. |
| PSA | When low, resets second decimal point counter to zero. FIG. 17. Output of gate 420. |
| RA | When raised high, subtracts one count from the contents of the L-Register. Used in Multiply and Divide. FIG. 16. |
| RC | Initiates Add Cycle at (S 1) $\overline{CL}$ time, due to action of AD, ADX, or Keyboard (+) Key. Sets Add high, and sets carry F-F to zero. FIG. 18. |

| | |
|---|---|
| RDM | When low, resets M-D counter to Zero. Occurs at start of Printout of Accumulator Register. FIG. 16. |
| RDP | When low, resets both decimal point counters to zero. Occurs when decimal point is printed on Accumulator Register unloading. FIG. 16. |
| RL | High during Clear. FIG. 18. |
| $\overline{RL}$ | Complement of RL. |
| $\overline{RL\ 1}$ | Complement of RL. FIG. 17. |
| RMD | When low, resets M-D counter to zero. Occurs whenever M-Scale is at M 16 (the normal standing position) FIG. 16. |
| RO | Logically equal to SS. When low, it resets the L-Register to excess-three twelve, which is the required state for receiving keyboard numberic data. FIG. 18. |
| RR | When low, resets L-Register to excess-three eleven. Occurs during Divide. FIG. 16. |
| RS | When high, sets L-Register equal to the number in right end of Accumulator Register. Used in Multiply and Print. FIG. 16. |
| RSA | Low during Accumulator Register Printout. FIG. 16. |
| $\overline{RSA}$ | Complement of RSA. |
| RST | At end of Printout of a Multiply or Divide Operation, this variable goes low to reset the machine without printing the usual (C) character. This automatic reset does not occur on a printout initiated by the (P) Key. FIG. 16. |
| S 1–S 16 | Shorthand notations for the four-bit codes defining the sixteen states of the S-Scale. The individual bits are named T-numbers. Example: S 16 - $\overline{T\ 4}$, $\overline{T\ 3}$, $\overline{T\ 2}$, $\overline{T\ 1}$. A run through all sixteen positions of this scale is required to do an Add, a Subtract, a Clear Operation, etc. On more complex operations, such as Multiply or Divide, the M-Scale is advanced one count for each complete rotation of the S-Scale. S 16 is the normal standing position. FIG. 18. |
| $\overline{S\ 6C}$ | The complement of (S 6) $\overline{CL}$ time. FIG. 18. |
| $\overline{S\ 8C}$ | The complement of (S 8) $\overline{CL}$ time. FIG. 18. |
| $\overline{S\ 10B}$ | The complement of (S 10) $\overline{CL}$ time. FIG. 18. |
| SUM 1, SUM 2, SUM 3, SUM 4 | Excess-three binary coded outputs of the serial Adder. It is the sum of X 1 – X 4 and Z 1–Z 4 taking account of the carry, CO. FIG. 15. |
| SA | When low, causes clock stop at (S 11) $\overline{CL}$ time, until Print Key is released. FIG. 18. |
| SAP | Triggers Print one-shot multivibrators for characters (+ – ×/C E) FIG. 18. |
| SB | Goes low to initiates Subtract Cycle. Occurs during Divide. FIG. 16. |
| SC | Initiates Subtract Cycle at (S 1) $\overline{CL}$ time, due to action of either SB, or the Keyboard (–) Key. Sets SUB high, and sets carry F – F to one. FIG. 18. |
| SM 1 | When low, sets M-Scale to M 1. FIG. 16. |
| SM 2 | Sets M-Scale to M 2. FIG. 16. |
| SM 3 | Sets M-Scale to M 3. FIG. 16. |
| SM 5 | Sets M-Scale to M 5. FIG. 16. |
| SM 12 | Sets M-Scale to M 12. FIG. 16. |
| SPA | Goes low to Print "Space" at end of each print operation. FIG. 16. |
| SPAC | Similar action to SPA, puts the space between quotient and remainder on Divide Printout. FIG. 16. |
| SPC | "Space" signal to Print Matrix. FIG. 18. |
| SS | Is low in normal standing position of machine, stops Clock at (S 16) $\overline{CL}$. Resets various circuits to normal. Is defeated by pressing |

| | |
|---|---|
| | any key (except decimal point), thereby starting clock. Prevented from stopping clock in middle of Multiply, Divide, and Print Operations by Signal DMO. FIG. 18. |
| STP | High when any one of the Print one-shot multivibrators is fired. Used to derive Clock-Stop Signals. FIG. 18. |
| SUB | High during Subtract. FIG. 17. |
| T 1, T 2, T 3, T 4 | Outputs of the S-scale. See S 1–S 16. FIG. 18. |
| $\overline{T\,1}, \overline{T\,2}, \overline{T\,3}, \overline{T\,4}$ | Complements of T 1, T 2, T 3, and T 4. |
| TIM | Goes low at (S 7) $\overline{CL}$ time, on Add or Subtract Operations. At this time the Operand Register has been added to the Accumulator Register. FIG. 18. |
| TRIG | Triggers the Print one-shot multivibrators. |
| | FIG. 16. |
| X 1, X 2, X 3, X 4 | Excess-three binary coded outputs of the Operand Register. FIG. 24. |
| $\overline{X\,1}, \overline{X\,2}, \overline{X\,3}, \overline{X\,4}$ | Complements of X 1, X 2, X 3 and X 4. |
| Y 1, Y 2, Y 3, Y 4 | Excess-three binary coded outputs of the Accumulator Register. FIG. 23. |
| $\overline{Y\,1}, \overline{Y\,2}, \overline{Y\,3}, \overline{Y\,4}$ | Complements of Y 1, Y 2, Y 3 and Y 4. |
| Z 1, Z 2, Z 3, Z 4 | Coded output from gate G 1 to the Serial Adder. FIG. 15. |

It is to be understood that the described embodiments are merely illustrative of the invention. Numerous other arrangments may be devised by those skilled in the art without departing from the spirit and scope of the invention as defined by the appended claims.

What is claimed is:

1. A miniature, portable, battery operated electronic calculator comprising:

a. input means including a keyboard for entering digits of numbers and arithmetic commands into said calculator and generating signals corresponding to said digits and said commands, the keyboard including only one set of decimal number keys for entering plural digits of decimal numbers in sequence and including a plurality of command keys;

b. electronic means responsive to said signals for performing arithmetic calculations on the numbers entered into the calculator and for generating control signals, said electronic means comprising an integrated semiconductor circuit array located in substantially one plane, the area occupied by the integrated semiconductor array being no greater than that of the keyboard, said integrated semiconductor circuit array comprising:

i. memory means for storing the digits of the numbers entered into the calculator, ii. arithmetic means coupled to said memory means for adding, subtracting, multiplying and dividing said numbers and storing the resulting answer in the memory means, and iii. means for selectively transferring numbers from the memory means through the arithmetic means and back to the memory means in a manner dependent upon the commands to effect the desired arithmetic operation;

c. means for providing a visual display coupled to said integrated semiconductor circuit array and responsive to said control signals for indicating said answer; and d. the entire calculator including keyboard, electronic means, means for providing a visual display, and battery being contained within a "pocket sized" housing.

2. A miniature electronic calculator according to claim 1 wherein the integrated semiconductor array essentially consists of a single semiconductor wafer.

3. A miniature electronic calculator according to claim 1 wherein the input means includes encoding means to provide unique coded signals representing the digits and commands.

4. A miniature electronic calculator according to claim 1 wherein the means for providing a visual display includes a thermal printhead and drive means for conveying thermally-sensitive paper into engagement with the printhead.

5. A miniature electronic calculator according to claim 1 wherein the memory means includes a plurality of shift registers.

6. A miniature electronic calculator comprising:

a. input means including a keyboard for entering digits of numbers and arithmetic commands into said calculator and generating unique signals corresponding to said digits and said commands, the keyboard including only one set of decimal number keys for entering plural digits of decimal numbers in sequence and including a plurality of command keys;

b. electronic means responsive to said signals for performing arithmetic calculations on the numbers entered into the calculator and for generating control signals, said electronic means comprising an integrated semiconductor circuit array located in substantially one plane, the integrated semiconductor array having lateral dimensions at most not substantially greater than that of the keyboard, said integrated semiconductor circuit array comprising:

i. memory means for storing the digits of the numbers entered into the calculator, ii. arithmetic means coupled to said memory means for adding, subtracting, multiplying and dividing said numbers and storing the resulting answer in the memory means, and iii. means for selectively transferring numbers from the memory means through the arithmetic means and back to the memory means in a manner dependent upon the commands to effect the desired arithmetic operation; and c. means for providing a visual display coupled to said integrated semiconductor circuit array and responsive to said control signals for indicating said answer.

7. A miniature electronic calculator according to claim 6 wherein the integrated semiconductor array essentially consists of a single semiconductor wafer.

8. A miniature electronic calculator according to claim 6 wherein the input means includes encoding means to provide unique coded signals representing the digits and commands.

9. A miniature electronic calculator according to claim 6 wherein the means for providing a visual display includes a thermal printhead and drive means for conveying thermally-sensitive paper into engagement with the printhead.

10. A miniature electronic calculator according to claim 6 wherein the memory means includes a plurality of shift registers.

11. A miniature electronic calculator according to claim 7 wherein the entire calculator including keyboard, electronic means, means for providing a visual display, as well as batteries for providing operating voltage, are all contained within a "pocket sized" housing.

12. An electronic calculator comprising:

a. input means including a keyboard for entering digits of numbers and commands into said calculator, the keyboard input means including one set of decimal number keys for entering digits of decimal numbers in sequence and a plurality of command keys for entering functional commands;

b. signal generating means for generating unique signals representing each of said entered digits and commands;

c. electronic means coupled to said signal generating means for storing and arithmetically combining said entered digits, the electronic means comprising an integrated semiconductor circuit array located in substantially one plane with the array being of area no greater than that of the keyboard, the electronic means including:

i. arithmetic means for serially arithmetically combining said entered digits in accordance with said command signals and for generating digits of a resulting answer, ii. register means including a plurality of separate registers coupled to said arithmetic means for serially storing said entered digits and serially storing digits of said resulting answer, the contents of the different registers being transferred to the arithmetic means depending upon the particular command signals, and iii. control means for generating a control signal indicative of the generation and storage of said resulting answer;

d. display means coupled to said electronic means for displaying each digit of said resulting answer, said display means including:

i. a printing medium for permanently recording the digits of said resulting answer, ii. an electronic printhead for printing the digits of said resulting answer on said printing medium, and iii. drive means for advancing said printing medium a predetermined distance after the printing of each digit of said resulting answer; and e. control means coupled to said signal generating means and to said electronic printhead and said drive means, said control means being responsive to said control signals for producing first delayed control signals to operate said electronic printhead and then producing second delayed control signals to activate said drive means for advancing said printing medium.

13. The electronic calculator of claim 12 wherein:

a. said printing medium comprises a temperature sensitive tape; and b. said electronic printhead comprises an electronically controlled thermal printhead; wherein c. said electronically controlled thermal printhead is thermally coupled with said temperature sensitive tape in response to said first delayed control signals to print and permanently record the digits of said resulting answer on said temperature sensitive tape.

14. The electronic calculator of claim 13 wherein said electronically controlled thermal printhead comprises an integrated semiconductor heater element array.

15. The electronic calculator of claim 14 wherein:

a. said input means includes a plurality of keys having movable conductive members wherein said keys represent the digits and commands entered into said calculator in a first coded format; and b. said signal generating means comprises encoding means for generating said unique signals in a second coded format, said encoding means including an insulating substrate and groups of conductors disposed upon one surface of said insulating substrate; wherein c. said movable conductive means are respectively disposed in relation to said conductors to electrically short-circuit selective conductors within said groups of conductors for generating said unique signals.

16. An electronic calculator comprising:

a. keyboard input means for entering digits of numbers and commands into said calculator, the keyboard input means including one set of decimal number keys for entering plural digits of decimal numbers in sequence and including a plurality of operand keys for entering functional commands;

b. signal generating means for generating first control signals indicative of the entry of each of said entered digits and generating unique signals representing each of said entered digits and commands;

c. memory means for storing digital and command signals;

d. means coupling said memory means to said generating means for transferring the signals representing said entered digits and commands into said memory means;

e. electronic means for arithmetically combining said entered digits including:

i. arithmetic means for serially arithmetically combining said entered digits in accordance with said command signals and for generating digits of a resulting answer, and ii. register means coupled to said memory means and to said arithmetic means for serially storing said entered digits and serially storing digits of said resulting answer, the contents of selected register means being processed through the arithmetic means;

f. gate means coupling said register means to said memory means for transferring digits of said resulting answer into said memory means, and for generating second control signals;

g. display means coupled to said memory means for displaying each of said entered digits and commands and each digit of said resulting answer, said display means including:

i. a printing medium for permanently recording the digits and commands stored in said memory means, ii. an electronic printhead for printing the digits stored in said memory means on said printing medium, and iii. drive means for advancing said printing medium a predetermined distance after the printing of each digit and command; and h. control means coupled to said signal generating means and to said electronic printhead and said drive means, said control means being responsive to said control signals for producing first delayed control signals to operate said electronic printhead and then producing second delayed control signals to activate said drive means for advancing said printing medium.

17. The electronic calculator of claim 16 wherein:

a. said printing medium comprises a temperature sensitive tape; and b. said electronic printhead comprises an electronically controlled thermal printhead; wherein c. said electronically controlled thermal printhead is thermally coupled with said temperature sensitive tape in response to said first delayed control signals to print and permanently record the digits of said resulting answer on said temperature sensitive tape.

18. The electronic calculator of claim 17 wherein said electronically controlled thermal printhead comprises an integrated semiconductor heater element array.

19. The electronic calculator of claim 16 wherein said first and second delay means are comprised of one-shot multivibrators.

20. The electronic calculator of claim 16 wherein:

a. said input means includes a plurality of keys having movable conductive members wherein said keys represent the digits and commands entered into said calculator in a first coded format; and b. said signal generating means comprises encoding means for generating said unique signals in a second coded format, said encoding means including an insulating substrate and groups of conductors disposed upon one surface of said insulating substrate; wherein c. said movable conductive means are respectively disposed in relation to said conductors to electrically short-circuit selective conductors within said groups of conductors for generating said unique signals.

21. The electronic calculator of claim 20 wherein said display means includes decoder means for decoding signals in said second coded format into information in said first coded format whereby digits of said resulting answer in said second coded format are printed in said first coded format.

22. The electronic calculator of claim 21 wherein digits in said first coded format are in decimal format and digits in said second coded format are in a form of binary format.

23. The electronic calculator of claim 16 including bias storage means coupled to said signal generating means, to said electronic means, and to said display means for respectively biasing said signal generating means, said memory means, and said display means.

24. An electronic calculator comprising:

a. keyboard input means for entering digits of numbers and commands into said calculator, including one set of decimal number keys for entering plural digits of decimal numbers in sequence and including a plurality of command keys;

b. signal generating means for generating unique signals representing each of said entered digits and commands;

c. electronic means coupled to said signal generating means for storing and arithmetically combining said entered digits in accordance with said entered commands, said electronic means including:

i. arithmetic means for serially arithmetically combining said entered digits and for generating digits of a resulting answer, and ii. memory means coupled to said signal generating means and to said arithmetic means for serially storing said entered digits and serially storing said resulting answer, the memory means including a plurality of registers, and the contents of different registers being transferred through the arithmetic means depending upon the function to be performed according to the entered command;

d. display means coupled to said memory means for displaying said resulting answer, said display means including:

I. a printing medium for permanently recording the digits of said resulting answer, ii. an electronic printhead for printing the digits of said resulting answer on said printing medium, and iii. drive means for advancing said printing medium a predetermined distance after the printing of each digit of said resulting answer; and e. bias storage means coupled to said signal generating means, to said electronic means, and to said display means for respectively biasing said signal generating means, said electronic means and said display means.

25. The electronic calculator of claim 24 wherein said electronic means comprises a semiconductor integrated circuit to which said bias storage means is coupled and said driver means is comprised of a solenoid to which said bias storage means is also coupled.

26. The electronic calculator of claim 24 wherein:

a. said input means includes a plurality of keys having movable conductive members wherein said keys represent the digits and commands entered into said calculator in a first coded format; and b. said signal generating means comprises encoding means for generating said unique signals in a second coded format, said encoding means including an insulating substrate and groups of conductors disposed upon one surface of said insulating substrate; wherein c. said movable conductive means are respectively disposed in relation to said conductors to electrically short-circuit selective conductors within said groups of conductors for generating said unique signals.

27. The electronic calculator of claim 26 wherein said display means includes a decoder means for decoding signals in said second coded format into information in said first coded format whereby digits of said resulting answer in said second coded format are printed in said first coded format.

28. An electronic calculator comprising:

a. input means for entering digits of numbers and commands into said calculator;

b. signal generating means for generating unique signals representing each of said entered digits and commands;

c. electronic means coupled to said signal generating means for storing and arithmetically combining said entered digits in accordance with said entered commands, said electronic means including:

i. arithmetic means for serially arithmetically combining said entered digits and for generating digits of a resulting answer, and ii. memory means coupled to said signal generating means and to said arithmetic means for serially storing said entered digits and serially storing said resulting answer;

d. display means coupled to said memory means for displaying said resulting answer, said display means including:

i. a printing medium for permanently recording the digits of said resulting answer, ii. an electronic printhead for printing the digits of said resulting answer on said printing medium, and iii. drive means for advancing said printing medium a predetermined distance after the printing of each digit of said resulting answer; and e. bias storage means having multiple bias taps for providing a plurality of bias levels, one of said bias taps being coupled to said electronic means for providing a first bias level for said electronic means and another of said bias taps being coupled to said driver means for providing a second bias level for said drive means.

29. The electronic calculator of claim 28 wherein said electronic means comprises a semiconductor integrated circuit to which said one bias tap is coupled and said drive means is comprised of a solenoid to which said other bias tap is coupled.

30. A miniature electronic calculator comprising:

a. keyboard input means for entering digits of numbers and commands into said calculator and generating unique coded signals corresponding to said digits and said commands, the keyboard input including only one set of ten decimal number keys for entering plural digits of decimal numbers in sequence, and including a plurality of command keys;

b. electronic means coupled to said input means and being responsive to said unique signals for performing arithmetic calculations on the numbers entered into the calculator and for generating control signals, said electronic means comprising an integrated semiconductor circuit array located in substantially one plane;

c. said integrated semiconductor circuit array comprising:

i. memory means including a plurality of registers for storing the digits of the numbers entered into the calculator and the coded commands, and ii. arithmetic means coupled to said memory means for arithmetically combining said digits and storing the resulting answer, the numbers being transferred from registers in the memory means to the arithmetic means and back to the memory means in a selectable manner depending upon the commands; and d. display means coupled to said integrated semiconductor circuit array and responsive to said control signals for displaying said resulting answer.

31. An electronic calculator according to claim 30 wherein said memory means comprises an integrated semiconductor shift register.

32. An electronic calculator according to claim 30 wherein said memory means comprises a plurality of interconnected integrated semiconductor shift registers forming an operand register and an accumulator register.

33. An electronic calculator according to claim 32 wherein said arithmetic means comprises:

a. a serial adder coupled to said operand and accumulator registers; and b. gating means coupled between said serial adder and said accumulator register for storing the resulting answer in said accumulator register.

34. An electronic calculator according to claim 30 wherein said integrated semiconductor circuit array includes clocking means responsive to said unique signals for generating said control signals.

35. An electronic calculator according to claim 34 wherein said clocking means comprises:

a. a clock flip-flop; and b. a counter coupled thereto.

36. An electronic calculator according to claim 30 wherein said arithmetic means includes means for adding, subtracting, multiplying and dividing said numbers.

37. An electronic calculator according to claim 30 wherein said integrated semiconductor circuit array includes decoding means responsive to the stored answer for generating electrical signals indicative of the shape in which the stored answer is to be displayed, the display means being coupled to said decoding means.

38. An electronic calculator according to claim 30 wherein said display means comprises a temperature sensitive tape and a thermal printer thermally coupled with said tape.

39. An electronic calculator according to claim 38 wherein said thermal printer comprises an integrated semiconductor heater element array.

40. An electronic calculator according to claim 38 wherein said display means includes tape advance means responsive to said control signals for advancing said tape a predetermined distance after a character is printed on said tape.

41. An electronic calculator according to claim 30 wherein said integrated semiconductor circuit array comprises a semiconductor substrate having a large plurality of similar functional units adjacent one surface thereof interconnected by multilevels of insulators and conductors on said one surface.

42. An electronic calculator according to claim 41 wherein said integrated semiconductor circuit array further comprises:

a. an insulating substrate having printed conductors thereon;

b. a plurality of said semiconductor substrates mounted on one surface of said insulating substrate;
c. conductive leads overlying said semiconductor substrates interconnecting functional units of one semiconductor substrate with functional units of another semiconductor substrate; and
d. conductive leads interconnecting functional units and said printed conductors on said insulating substrate.

43. An electronic calculator according to claim 30 wherein said means for entering digits of numbers and commands into said calculator and generating unique signals corresponding to said digits and said commands comprises encoding means located in substantially one plane including an insulating substrate and groups of conductors disposed upon one surface of said insulating substrate and movable conductive means for respectively, selectively, electrically short-circuiting the conductors within said groups of conductors for generating said unique signals.

44. An electronic calculator according to claim 43 wherein said encoding means is mounted parallel to said integrated semiconductor circuit array.

45. An electronic calculator comprising:
a. input means for entering digits of numbers and commands into said calculator and generating unique signals corresponding to said digits and said commands, the input means including a keyboard having only one set of ten decimal number keys for entering plural digits of decimal numbers in sequence and a plurality of command keys, said input means comprising encoding means located in substantially one plane, said encoding means including:
   i. an insulating substrate,
   ii. groups of conductors disposed upon one surface of said insulating substrate, and
   iii. movable conductive means for respectively, selectively, electrically short-circuiting the conductors within said groups of conductors;
b. electronic means responsive to said unique signals for performing arithmetic calculations on the numbers entered into the calculator and for generating control signals, said electronic means substantially comprising an integrated semiconductor circuit array located in substantially one plane parallel with said encoding means, said integrated semiconductor circuit array comprising:
   i. memory means including plural registers for storing the digits of the numbers entered into the calculator,
   ii. arithmetic means coupled to said memory means for arithmetically combining said digits and storing the resulting answer, and
   iii. control means for transferring numbers from different ones of the registers of the memory means to the arithmetic means to produce differing arithmetic functions depending upon the commands; and
c. means coupled to said integrated semiconductor circuit array and responsive to said control signals for displaying said resulting answer.

46. An electronic calculator according to claim 45 wherein:
a. said memory means comprises a plurality of interconnected integrated semiconductor shift registers forming an operand register and an accumulator register;
b. said arithmetic means comprises a serial adder coupled to said operand and accumulator registers; and
c. said electronic means further includes gating means coupled between said serial adder and said accumulator register for storing the resulting answer in said accumulator register.

47. An electronic calculator according to claim 45 wherein said encoding means directly encodes the digit entries into a binary form of coding so that said unique signals correspond to the binary form of encoded digit entries.

48. An electronic calculator according to claim 47 wherein said integrated semiconductor circuit array includes a register coupled to said encoder means for storing said unique signals in the binary form.

49. An electronic calculator according to claim 45 wherein said integrated semiconductor circuit array comprises:
a. an insulating substrate having printed conductors thereon;
b. a plurality of semiconductor substrates mounted on one surface of said insulating substrate, said plurality of semiconductor substrates having a large plurality of similar functional units adjacent one surface thereof interconnected by multilevels of insulators and conductors overlying said one surface;
c. conductive leads overlying said semiconductor substrates interconnecting functional units of one semiconductor substrate with functional units of another semiconductor substrate; and
d. conductive leads interconnecting functional units and said printed conductors on said insulating substrate.

50. An electronic calculator comprising: a. input means for entering digits of numbers and commands into said calculator and generating unique signals corresponding to said digits and said commands, said input means comprising encoding means located in substantially one plane, said encoding means including:
   i. an insulating substrate,
   ii. groups of conductors disposed upon one surface of said insulating substrate, and
   iii. movable conductive means for respectively, selectively, electrically short-circuiting the conductors within said groups of conductors;
b. electronic means responsive to said unique signals for performing arithmetic calculations on the numbers entered into the calculator and for generating control signals, said electronic means substantially comprising an integrated semiconductor circuit array located in substantially one plane parallel with the one plane in which said encoding means is located, said integrated semiconductor circuit array comprising:
   i. memory means for storing the digits of the numbers entered into the calculator, and
   ii. arithmetic means coupled to said memory means for arithmetically combining said digits and storing the resulting answer; and
c. display means coupled to said integrated semiconductor circuit array for displaying said answer comprising:
   i. a temperature sensitive tape, and ii. an integrated semiconductor heater element array thermally coupled with said tape in response to said control signals.

51. An electronic calculator according to claim 50 wherein:

a. said memory means comprises a plurality of interconnected integrated semiconductor shift registers forming an operand register and an accumulator register; and b. said arithmetic means comprises a serial adder coupled to said operand and accumulator registers and said electronic means further includes gating means coupled between said serial adder and said accumulator register for storing the resulting answer in said accumulator register.

52. An electronic calculator according to claim 51 wherein said integrated semiconductor circuit array includes decoding means coupled to said accumulator register for generating electrical signals indicative of the shape in which the stored answer is to be displayed, said decoding means being coupled to said integrated semiconductor heater element array.

53. A miniature electronic calculator comprising:

a. keyboard input means for entering digits of numbers and arithmetic commands into said claculator and generating unique signals corresponding to said digits and said commands, the keyboard input means including only one set of decimal number keys for entering plural digits of decimal numbers in sequence and a plurality of command keys:

b. electronic means responsive to said unique signals for performing arithmetic calculations on the numbers entered into the calculator and for generating control signals, said electronic means substantially comprising an integrated semiconductor circuit array located in substantially one plane, said integrated semiconductor circuit array comprising:

i. memory means including a plurality of registers for storing the digits of the numbers and the commands entered into the calculator, ii. arithmetic means coupled to said memory means for adding, subtracting, multiplying and dividing said numbers and storing the resulting answer, and iii. variable means for selectively transferring numbers serially from the registers through the arithmetic means and back to the registers in a manner dependent upon the commands to effect the desired arithmetic operation; and c. means for providing a visual display coupled to said integrated semiconductor circuit array and responsive to said control signals for indicating said answer.

54. A miniature electronic calculator comprising:

a. input means for entering digits of numbers and arithmetic commands into said calculator and for generating unique signals corresponding to said digits and said commands;

b. electronic means responsive to said unique signals for performing arithmetic calculations on the numbers entered into the calculator and for generating control signals, said electronic means substantially comprising an integrated semiconductor circuit array located in substantially one plane, said integrated semiconductor circuit array comprising:

i. memory means for storing the digits of the numbers entered into the calculator, and ii. arithmetic means coupled to said memory means for adding, subtracting, multiplying and dividing said numbers and storing the resulting answer;

c. recording means coupled to said integrated semiconductor circuit array for permanently recording said answer, said recording means comprising:

i. a printing medium for permanently recording said selected information in said first coded format, ii. an electronic printhead for printing said information in said first coded format on said printing medium, and iii. drive means for advancing said printing medium a predetermined distance after each printing cycle; and d. control means coupled to said signal generating means and to said electronic printhead and said drive means, said control means being responsive to said control signals for producing first delayed control signals to operate said electronic printhead and then producing second delayed control signals to activate said drive means for advancing said printing medium.

55. A miniature electronic calculator comprising:

a. input means for entering digits of numbers and arithmetic commands into said calculator and generating unique signals corresponding to said digits and said commands, said input means comprising encoding means located substantially in one plane, said encoding means including:

i. an insulating substrate, ii. groups of conductors disposed upon one surface of said insulating substrate, and iii. movable conductive means for respectively, selectively, electrically short-circuiting the conductors within said groups of conductors, b. electronic means responsive to said unique signals for performing the arithmetic calculations on the numbers entered into the calculator and for generating control signals, said electronic means substantially comprising an integrated semiconductor circuit array located in substantially one plane parallel to said encoding means, said integrated semiconductor circuit array comprising:

i. memory means for storing the digits of the numbers entered into the calculator, and ii. arithmetic means coupled to said memory means for adding, subtracting, multiplying and dividing said numbers and storing the resulting answer; and c. means coupled to said integrated semiconductor circuit array and responsive to said control signals for recording said answer.

56. A miniature electronic calculator according to claim 55 wherein said encoding means directly encodes the digit entries into a form of binary coding so that said unique signals correspond to the binary form of encoded digit entries.

57. A miniature electronic calculator comprising:

a. input means for entering digits of numbers and arithmetic commands into said calculator and generating unique signals corresponding to said digits and said commands;

b. electronic means responsive to said unique signals for performing arithmetic calculations on the numbers entered into the calculator and for generating control signals, said electronic means comprising an integrated semiconductor circuit array located in substantially one plane, said integrated semiconductor circuit array comprising a semiconductor substrate having a large plurality of similar functional units adjacent one surface thereof interconnected by multilevels of insulators and conductors overlying said one surface, said interconnected functional units comprising:

i. a clocking means for generating timing signals in response to said unique signals, and ii. gating means responsive to said timing signals for generating said control signals; and c. means coupled to said integrated semiconductor circuit array and responsive to said control signals for recording the answer of said arithmetic calculations.

58. A miniature electronic calculator comprising:

a. keyboard input means for entering digits of decimal numbers and arithmetic commands into said calculator and generating unique coded signals corresponding to said digits and said commands;

b. electronic means responsive to said unique signals for performing arithmetic calculations on said numbers entered into the calculator and for generating control signals, said electronic means substantially comprising an integrated semiconductor circuit array located in substantially one plane;

c. said integrated semiconductor circuit array comprising:

i. memory means for storing the digits of the numbers entered into the calculator, and ii. arithmetic means coupled to said memory means for adding, subtracting, multiplying and dividing said numbers and storing the resulting answer;

d. said integrated semiconductor circuit array further comprising a semiconductor substrate having a large plurality of similar functional units adjacent one surface thereof interconnected by multilevels of insulators and conductors overlying said one surface; and e. recording means coupled to said integrated semiconductor circuit array and responsive to said control signals for permanently recording said answer.

59. An electronic calculator comprising:

a. input means for entering digits of numbers and commands into said calculator;

b. signal generating means for generating unique signals representing each of said entered digits and commands;

c. electronic means coupled to said signal generating means for storing and arithmetically combining said entered digits including:

i. arithmetic means for serially arithmetically combining said entered digits in accordance with said command signals and for generating digits of a resulting answer, ii. shift register means coupled to said arithmetic means for serially storing said entered digits and serially storing digits of said resulting answer, and iii. control means for generating a control signal indicative of the generation and storage of said resulting answer;

d. display means coupled to said electronic means for displaying each digit of said resulting answer, said display means including:

i. a printing medium for permanently recording the digits of said resulting answer, ii. an electronic printhead for printing the digits of said resulting answer on said printing medium, and iii. drive means for advancing said printing medium a predetermined distance after the printing of each digit of said resulting answer; and e. first and second series coupled delay means, said first delay means being responsive to said control signals for producing first delayed control signals to operate the electronic printhead and said second delay means being responsive to said first delayed control signals for producing second delayed control signals to activate said drive means for advancing said printing medium.

* * * * *